US011101901B2

(12) United States Patent
Yokomakura et al.

(10) Patent No.: US 11,101,901 B2
(45) Date of Patent: Aug. 24, 2021

(54) BASE STATION APPARATUS, TERMINAL APPARATUS, COMMUNICATION METHOD, AND INTEGRATED CIRCUIT

(71) Applicants: Sharp Kabushiki Kaisha, Sakai (JP); FG Innovation Company Limited, Tuen Mun (HK)

(72) Inventors: Kazunari Yokomakura, Sakai (JP); Shohei Yamada, Sakai (JP); Hidekazu Tsuboi, Sakai (JP); Hiroki Takahashi, Sakai (JP)

(73) Assignees: FG Innovation Company Limited, Hong Kong (HK); Sharp Kabushiki Kaisha, Osaka (JP)

( * ) Notice: Subject to any disclaimer, the term of this patent is extended or adjusted under 35 U.S.C. 154(b) by 48 days.

(21) Appl. No.: 16/608,237

(22) PCT Filed: Apr. 25, 2018

(86) PCT No.: PCT/JP2018/016793
§ 371 (c)(1),
(2) Date: Oct. 25, 2019

(87) PCT Pub. No.: WO2018/199162
PCT Pub. Date: Nov. 1, 2018

(65) Prior Publication Data
US 2020/0195358 A1 Jun. 18, 2020

(30) Foreign Application Priority Data

Apr. 27, 2017 (JP) .............................. JP2017-088206

(51) Int. Cl.
H04L 12/26 (2006.01)
H04B 17/318 (2015.01)
H04W 48/10 (2009.01)

(52) U.S. Cl.
CPC .......... *H04B 17/318* (2015.01); *H04W 48/10* (2013.01)

(58) Field of Classification Search
CPC .... H04B 17/318; H04W 48/10; H04W 24/10; H04W 48/12; H04W 48/16; H04W 36/0094; H04L 5/0048; H04L 5/0094
(Continued)

(56) References Cited

U.S. PATENT DOCUMENTS

2019/0349108 A1* 11/2019 Takeda ................. H04J 11/0073
2020/0068420 A1* 2/2020 Chen ..................... H04W 36/00

OTHER PUBLICATIONS

Intel, "Synchronization Signal Periodicity", R1-1704710, Apr. 2017 (From Applicant's IDS) (Year: 2017).*
(Continued)

*Primary Examiner* — Mang Hang Yeung
(74) *Attorney, Agent, or Firm* — Imperium Patent Works

(57) ABSTRACT

A terminal apparatus includes: a higher layer processing unit configured to receive first information and second information; and a receiver configured to receive a block including a first signal, a second signal, a third signal, and a physical broadcast channel, wherein the first information includes information for indicating a periodicity of one or more of the blocks, the second information includes information for indicating time positions of the one or more of the blocks included in a certain time period, a cell ID is detected from the first signal and the second signal, and an index of the block is detected from the third signal.

6 Claims, 13 Drawing Sheets

(58) Field of Classification Search
USPC .......................................................... 370/252
See application file for complete search history.

(56) References Cited

OTHER PUBLICATIONS

Nokia and Alcatel-Lucent Shanghai Bell, "On Requirements and Design of SS Burst Set and SS Block Index Indication", R1-1703092, Feb. 2017 (From Applicant's IDS) (Year: 2017).*

Ericsson, "Store System Information", R2-1702858, Apr. 2017 (From Applicant's IDS) (Year: 2017).*

Official Communication issued in International Patent Application No. PCT/JP2018/016793, dated Jul. 24, 2018.

NTT DOCOMO, "Revision of SI: Study on New Radio Access Technology", 3GPP TSG RAN Meeting #72, RP-161214, Jun. 13-16, 2016, 8 pages.

NTT DOCOMO, Inc., "Discussion on initial access procedure for NR", 3GPP TSG RAN WG1 Meeting #87, R1-1612723, Nov. 14-18, 2016, 5 pages.

Nokia et al., "On Synchronization Signals for Single-beam and Multi-beam Configurations", 3GPP TSG-RAN WG1#87, R1-1612801, Nov. 14-18, 2016, 4 pages.

LG Electronics, "Discussion on SS block, SS burst set composition and time index indication", 3GPP TSG RAN WG1 Meeting #88bis, R1-1704862, Apr. 3-7, 2017, 8 pages.

Nokia et al., "On Requirements and Design of SS Burst Set and SS Block Index Indication", 3GPP TSG-RAN WG1 Meeting #88, R1-1703092, Feb. 13-17, 2017, 13 pages.

Ericsson, "Stored system information", 3GPP TSG-RAN WG2 #97bis, Tdoc R2-1702858, Apr. 3-7, 2017, pp. 1-4.

Intel Corporation, "Synchronization Signal Periodicity", 3GPP TSG RAN WG1 Meeting RAN1 #88, R1-1704710, Apr. 3-7, 2017, pp. 1-4.

Nokia et al., "On Requirements and Design of SS Burst Set", 3GPP TSG-RAN WG1 NR AH meeting, R1-1701058, Jan. 16-20, 2017, 10 pages.

ZTE et al., "Composition of SS block, burst and burst set", 3GPP TSG RAN WG1 Meeting #88bis, R1-1704358, Apr. 3-7, 2017, 10 pages.

LG Electronics, "Discussion on RRM measurement in NR", 3GPP TSG RAN WG1 Meeting #88bis, R1-1704870, Apr. 3-7, 2017, 4 pages.

MCC Support, "Final Report of 3GPP TSG RAN WG1 #88bis v1.0.0", 3GPP TSG RAN WG1 Meeting #89, R1-1708890, May 15-19, 2017, 176 pages.

Nokia et al, "CSI-RS for mobility purposes", vol. RAN WG1, No. Spokane, WA, USA; Apr. 2, 2017, 3GPP Draft; R1-1705843, Mobile Competence Centre ; 650, Route Des Lucioles ; F-06921 Sophia-Antipolis Cedex ; France, * the whole document *.

Intel Corporation, "RRM Measurements for NR", vol. RAN WG1, No. Nagoya, Japan; Sep. 12, 2017, 3GPP Draft; R1-1716282 Intel RRM, Mobile Competence Centre ; 650, Route Des Lucioles ; F-06921 Sophia-Antipolis Cedex ; France, * the whole document *.

Intel Corporation, "Measurement framework in NR", 3GPP TSG RAN WG2 Meeting #97bis, R2-1703420, Apr. 3-7, 2017, pp. 1-3.

Huawei et al., "WF on synchronization and carrier rasters", 3GPP TSG RAN WG1 #86bis, R1-1611035, Oct. 10-14, 2016, 3 pages.

Huawei et al., "Discussion on SS burst set composition and SS block time index indication", 3GPP TSG RAN WG1 Meeting #88, R1-1703353, Feb. 13-17, 2017, pp. 1-7.

\* cited by examiner

BASE STATION APPARATUS, TERMINAL APPARATUS, COMMUNICATION METHOD, AND INTEGRATED CIRCUIT

TECHNICAL FIELD

The present invention relates to a base station apparatus, a terminal apparatus, a communication method, and an integrated circuit.

This application claims priority based on JP 2017-088206 filed on Apr. 27, 2017, the contents of which are incorporated herein by reference.

BACKGROUND ART

Technical studies and standardization of Long Term Evolution (LTE)-Advanced Pro and New Radio (NR) technology, as a radio access scheme and a radio network technology for fifth generation cellular systems, are currently conducted by the Third Generation Partnership Project (3GPP) (NPL 1).

The fifth generation cellular system requires three anticipated scenarios for services: enhanced Mobile BroadBand (eMBB) which realizes high-speed, high-capacity transmission, Ultra-Reliable and Low Latency Communication (URLLC) which realizes low-latency, high-reliability communication, and massive Machine Type Communication (mMTC) that allows a large number of machine type devices to be connected in a system such as Internet of Things (IoT).

In NR, configurations and procedures for initial access at high frequencies have been studied (NPL 2, NPL 3, and NPL 4).

CITATION LIST

Non Patent Literature

NPL 1: RP-161214, NTT DOCOMO, "Revision of SI: Study on New Radio Access Technology", June 2016
NPL 2: R1-1612723, NTT DOCOMO, "Discussion on initial access procedure for NR", November 2016
NPL 3: R1-1612801, Nokia, Alcatel-Lucent Shanghai Bell, "On Synchronization Signals for Single-beam and Multi-beam Configurations", November 2016
NPL 4: R1-1704862, LG Electronics, "Discussion on SS block, SS burst set composition and time index indication", April 2017

SUMMARY OF INVENTION

Technical Problem

An object of the present invention is to allow a terminal apparatus and a base station apparatus to efficiently provide the terminal apparatus, base station apparatus, a communication method, and an integrated circuit in the above-mentioned radio communication systems.

Solution to Problem (1) To accomplish the object described above, aspects of the present invention are contrived to provide the following measures. Specifically, a terminal apparatus according to an aspect of the present invention is a terminal apparatus including: a higher layer processing unit configured to receive first information and second information; and a receiver configured to receive a block including a first signal, a second signal, a third signal, and a physical broadcast channel, wherein the first information includes information for indicating a periodicity of one or more of the blocks, the second information includes information for indicating time positions of the one or more of the blocks included in a certain time period, a cell ID is detected from the first signal and the second signal, and an index of the block is detected from the third signal.

(2) A base station apparatus according to an aspect of the present invention is a base station apparatus including: a higher layer processing unit configured to transmit first information and second information; and a transmitter configured to transmit a block including a first signal, a second signal, a third signal, and a physical broadcast channel, wherein the first information includes information for indicating a periodicity of one or more of the blocks, the second information includes information for indicating time positions of the one or more of the blocks included in a certain time period, the first signal and the second signal are defined based on a cell ID, and the third signal is defined based on an index of the block.

(3) A communication method according to an aspect of the present invention is a communication method for a terminal apparatus, the communication method including the steps of: receiving first information and second information; and receiving a block including a first signal, a second signal, a third signal, and a physical broadcast channel, wherein the first information includes information for indicating a periodicity of one or more of the blocks, the second information includes information for indicating time positions of the one or more of the blocks included in a certain time period, a cell ID is detected from the first signal and the second signal, and an index of the block is detected from the third signal.

(4) A communication method according to an aspect of the present invention is a communication method for a base station apparatus, the communication method including the steps of: transmitting first information and second information; and transmitting a block including a first signal, a second signal, a third signal, and a physical broadcast channel, wherein the first information includes information for indicating a periodicity of one or more of the blocks, the second information includes information for indicating time positions of the one or more of the blocks included in a certain time period, the first signal and the second signal are defined based on a cell ID, and the third signal is defined based on an index of the block.

(5) An integrated circuit according to an aspect of the present invention is an integrated circuit mounted in a terminal apparatus, the integrated circuit including: a higher layer processing component configured to receive first information and second information; and a receiving component configured to receive a block including a first signal, a second signal, a third signal, and a physical broadcast channel, wherein the first information includes information for indicating a periodicity of one or more of the blocks, the second information includes information for indicating time positions of the one or more of the blocks included in a certain time period, a cell ID is detected from the first signal and the second signal, and an index of the block is detected from the third signal.

(6) An integrated circuit according to an aspect of the present invention is an integrated circuit mounted in a base station apparatus, the integrated circuit including: a higher layer processing component configured to transmit first information and second information; and a transmitting component configured to transmit a block including a first signal, a second signal, a third signal, and a physical broadcast channel, wherein the first information includes information for indicating a periodicity of one or more of the blocks, the second information includes information for indicating time positions of the one or more of the blocks included in a certain time period, the first signal and the second signal are defined based on a cell ID, and the third signal is defined based on an index of the block.

Advantageous Effects of Invention

According to an aspect of the present invention, a base station apparatus and a terminal apparatus can efficiently communicate with each other.

DESCRIPTION OF EMBODIMENTS

Embodiments of the present invention will be described below.

Figure 1:
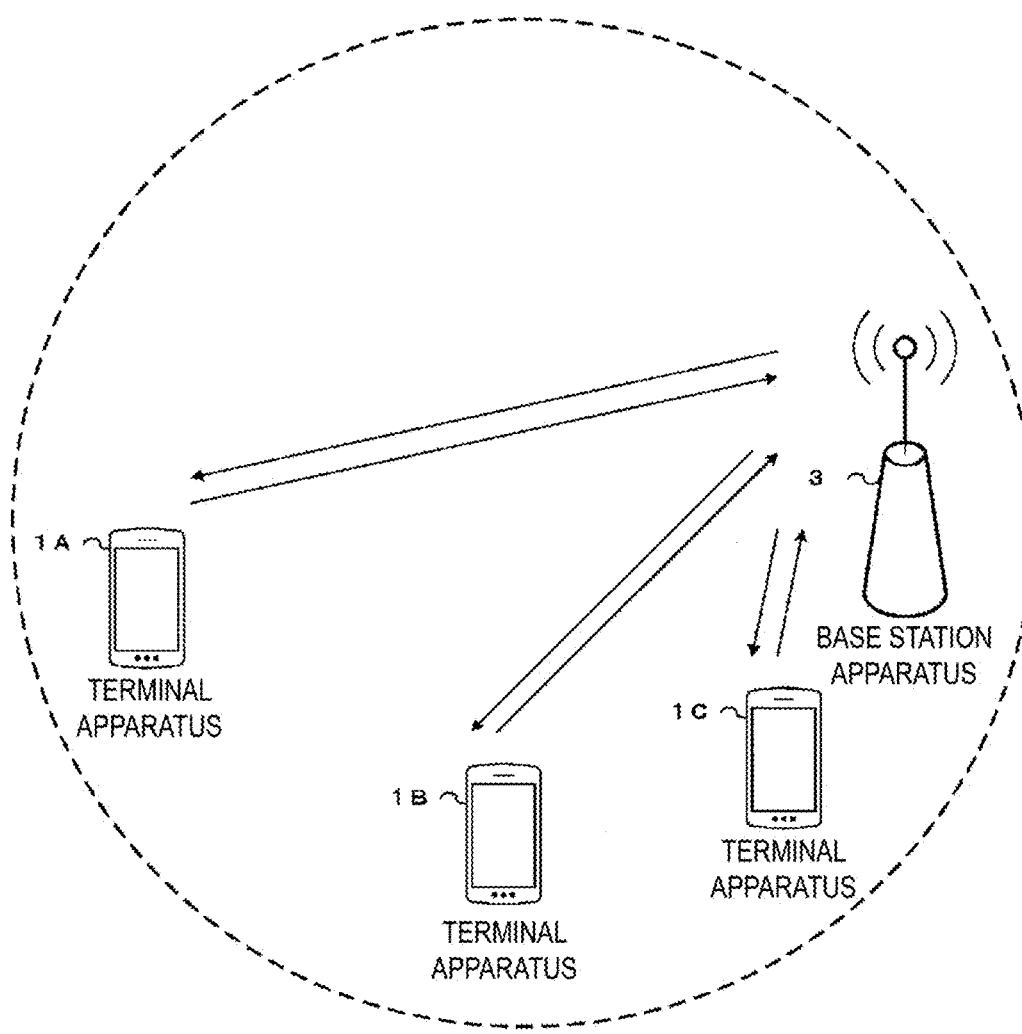
FIG. 1 is a diagram illustrating a concept of a radio communication system according to the present embodiment.

FIG. 1 is a conceptual diagram of a radio communication system according to the present embodiment. In FIG. 1, a radio communication system includes terminal apparatuses 1A to 1C and a base station apparatus 3. Hereinafter, each of the terminal apparatuses 1A to 1C is also referred to as a terminal apparatus 1.

The terminal apparatus 1 is also referred to as a user terminal, a mobile station device, a communication terminal, a mobile device, a terminal, User Equipment (UE), and a Mobile Station (MS). The base station apparatus 3 is also referred to as a radio base station apparatus, a base station, a radio base station, a fixed station, a NodeB (NB), an evolved NodeB (eNB), a Base Transceiver Station (BTS), a Base Station (BS), an NR NodeB (NR NB), NNB, a Transmission and Reception Point (TRP), or gNB.

In FIG. 1, in a radio communication between the terminal apparatus 1 and the base station apparatus 3, Orthogonal Frequency Division Multiplexing (OFDM) including a Cyclic Prefix (CP), Single-Carrier Frequency Division Multiplexing (SC-FDM), Discrete Fourier Transform Spread OFDM (DFT-S-OFDM), or Multi-Carrier Code Division Multiplexing (MC-CDM) may be used.

Furthermore, in FIG. 1, in the radio communication between the terminal apparatus 1 and the base station apparatus 3, Universal-Filtered Multi-Carrier (UFMC), Filtered OFDM (F-OFDM), Windowed OFDM, or Filter-Bank Multi-Carrier (FBMC) may be used.

Note that the present embodiment will be described by using OFDM symbol with the assumption that a transmission scheme is OFDM, and use of any other transmission scheme is also included in an aspect of the present invention.

Furthermore, in FIG. 1, in the radio communication between the terminal apparatus 1 and the base station apparatus 3, the CP may not be used, or the above-described transmission scheme with zero padding may be used instead of the CP. Moreover, the CP or zero padding may be added both forward and backward.

In FIG. 1, in a radio communication between the terminal apparatus 1 and the base station apparatus 3, Orthogonal Frequency Division Multiplexing (OFDM) including a Cyclic Prefix (CP), Single-Carrier Frequency Division Multiplexing (SC-FDM), Discrete Fourier Transform Spread OFDM (DFT-S-OFDM), or Multi-Carrier Code Division Multiplexing (MC-CDM) may be used.

In FIG. 1, the following physical channels are used for the radio communication between the terminal apparatus 1 and the base station apparatus 3.

Physical Broadcast CHannel (PBCH)
Physical Control CHannel (PCCH)
Physical Shared CHannel (PSCH)

The PBCH is used to broadcast essential information block ((Master Information Block (MIB), Essential Information Block (EIB), and Broadcast Channel (BCH)) which includes essential system information needed by the terminal apparatus 1.

The PCCH is used to transmit Uplink Control Information (UCI) in a case of uplink radio communication (radio communication from the terminal apparatus 1 to the base station apparatus 3). Here, the uplink control information may include Channel State Information (CSI) used to indicate a downlink channel state. The uplink control information may include Scheduling Request (SR) used to request an UL-SCH resource. The uplink control information may include Hybrid Automatic Repeat request ACKnowledgment (HARQ-ACK). The HARQ-ACK may indicate a HARQ-ACK for downlink data (Transport block, Medium Access Control Protocol Data Unit (MAC PDU), or Downlink-Shared channel (DL-SCH)).

Furthermore, the PCCH is used to transmit Downlink Control Information (DCI) in a case of downlink radio communication (radio communication from the base station apparatus 3 to the terminal apparatus 1). Here, one or more DCI (which may be referred to as DCI formats) are defined for transmission of the downlink control information. In other words, a field for the downlink control information is defined as DCI and is mapped to information bits.

For example, the DCI may be defined to include information for indicating whether a signal included in a scheduled PSCH corresponds to downlink radio communication or uplink radio communication.

For example, the DCI may be defined to include information for indicating a downlink transmission period included in a scheduled PSCH.

For example, the DCI may be defined to include information for indicating an uplink transmission period included in a scheduled PSCH.

For example, the DCI may be defined to include information for indicating a timing for transmitting HARQ-ACK with respect to a scheduled PSCH (for example, the number of symbols from the last symbol included in the PSCH to the symbol for transmission of the HARQ-ACK).

For example, the DCI may be defined to include information for indicating a downlink transmission period, a gap, and an uplink transmission period included in a scheduled PSCH.

For example, the DCI may be defined to be used for the scheduling of a downlink radio communication PSCH in a cell (transmission of a downlink transport block).

For example, the DCI may be defined to be used for the scheduling of an uplink radio communication PSCH in a cell (transmission of an uplink transport block).

Here, the DCI includes information about the scheduling of the PSCH in a case that the PSCH includes the uplink or the downlink. Here, the DCI for the downlink is also referred to as downlink grant or downlink assignment. Here, the DCI for the uplink is also referred to as uplink grant or Uplink assignment.

The PSCH is used to transmit uplink data (Uplink Shared CHannel (UL-SCH)) or downlink data (Downlink Shared CHannel (DL-SCH)) from Medium Access Control (MAC). In a case of the downlink, the PSCH is also used to transmit System Information (SI), a Random Access Response (RAR), and the like. In a case of the uplink, the PSCH may be used to transmit the HARQ-ACK and/or CSI along with the uplink data. The PSCH may be used to transmit the CSI only or the HARQ-ACK and CSI only. In other words, the PSCH may be used to transmit the UCI only.

Here, the base station apparatus 3 and the terminal apparatus 1 exchange (transmit and/or receive) signals with each other in their respective higher layers. For example, in a Radio Resource Control (RRC) layer, the base station apparatus 3 and the terminal apparatus 1 may transmit and/or receive RRC signaling (also referred to as a Radio Resource Control message (RRC message) or Radio Resource Control information (RRC information)). In a Medium Access Control (MAC) layer, the base station apparatus 3 and the terminal apparatus 1 may transmit and/or receive a MAC control element. Here, system information (broadcast signal and the like), the RRC signaling, and/or the MAC control element is also referred to as higher layer signaling.

The PSCH may also be used to transmit the system information, the RRC signaling, and/or the MAC control element. Here, the RRC signaling transmitted from the base station apparatus 3 may be signaling common to multiple terminal apparatuses 1 in a cell. The RRC signaling transmitted from the base station apparatus 3 may be signaling dedicated to a certain terminal apparatus 1 (also referred to as dedicated signaling). In other words, terminal apparatus-specific (UE-specific) information may be transmitted through signaling dedicated to the certain terminal apparatus 1. The PSCH may be used to transmit UE Capabilities in the uplink.

Note that although the same designations of PCCH and PSCH are commonly used for the downlink and the uplink, different channels may be defined for the downlink and for the uplink.

For example, a downlink shared channel may be referred to as a Physical Downlink Shared CHannel (PDSCH). An uplink shared channel may be referred to as a Physical Uplink Shared CHannel (PUSCH). A downlink control channel may be referred to as a Physical Downlink Control CHannel (PDCCH). An uplink control channel may be referred to as a Physical Uplink Control CHannel (PUCCH).

In FIG. 1, the following downlink physical signals are used for downlink radio communication. Here, the downlink physical signals are not used to transmit the information output from the higher layers but are used by the physical layer.

Synchronization signal (SS)
Reference Signal (RS)

The synchronization signal may include a Primary Synchronization Signal (PSS) and/or a Secondary Synchronization Signal (SSS). A cell ID may be detected by using the PSS and SSS.

The synchronization signal is used for the terminal apparatus 1 to establish synchronization in a frequency domain and/or a time domain in the downlink. Here, the synchronization signal may be used for the terminal apparatus 1 to select precoding or a beam in precoding or beamforming performed by the base station apparatus 3.

A reference signal is used for the terminal apparatus 1 to perform channel compensation on a physical channel. Here, the reference signal may be used for the terminal apparatus 1 to calculate the downlink CSI. The reference signal may be used for a numerology such as a radio parameter or subcarrier spacing, or used for Fine synchronization that allows FFT window synchronization to be achieved.

According to the present embodiment, at least one of the following downlink reference signals are used.

Demodulation Reference Signal (DMRS)
Channel State Information Reference Signal (CSI-RS)
Phrase Tracking Reference Signal (PTRS)
Mobility Reference Signal (MRS)

The DMRS is used to demodulate a modulated signal. Note that two types of reference signals may be defined as the DMRS: a reference signal for demodulating the PBCH and a reference signal for demodulating the PSCH or that both reference signals may be referred to as the DMRS. The CSI-RS is used for measurement of Channel State Information (CSI) and/or beam management. The PTRS is used to track phase according to movement of the terminal or the like. The MRS may be used to measure quality of reception from multiple base station apparatuses for handover. The reference signal may be defined as a reference signal for compensating for phase noise.

The downlink physical channels and/or the downlink physical signals are collectively referred to as a downlink signal. The uplink physical channels and/or the uplink physical signals are collectively referred to as an uplink signal. The downlink physical channels and/or the uplink physical channels are collectively referred to as a physical channel. The downlink physical signals and/or the uplink physical signals are collectively referred to as a physical signal.

The BCH, the UL-SCH, and the DL-SCH are transport channels. A channel used in the Medium Access Control (MAC) layer is referred to as a transport channel. A unit of the transport channel used in the MAC layer is also referred to as a Transport block (TB) and/or a MAC Protocol Data Unit (PDU). A Hybrid Automatic Repeat reQuest (HARQ) is controlled for each transport block in the MAC layer. The transport block is a unit of data that the MAC layer delivers to the physical layer. In the physical layer, the transport block is mapped to a codeword, and coding processing is performed for each codeword.

The reference signal may also be used for Radio Resource Measurement (RRM). The reference signal may also be used for beam management.

Beam management may be a procedure of the base station apparatus 3 and/or the terminal apparatus 1 for matching directivity of an analog and/or digital beam in a transmission apparatus (the base station apparatus 3 in the downlink and the terminal apparatus 1 in the uplink) with directivity of an analog and/or digital beam in a reception apparatus (the terminal apparatus 1 in the downlink and the base station apparatus 3 in the uplink) to acquire a beam gain.

Note that the procedure described below may be included as a procedure for constituting, configuring or establishing a beam pair link.

Beam selection
Beam refinement
Beam recovery

For example, the beam selection may be a procedure for selecting a beam in communication between the base station apparatus 3 and the terminal apparatus 1. The beam refinement may be a procedure for selecting a beam having a higher gain or changing a beam to an optimum beam between the base station apparatus 3 and the terminal apparatus 1 according to the movement of the terminal apparatus 1. The beam recovery may be a procedure for re-selecting the beam in a case that the quality of a communication link is degraded due to blockage caused by a blocking object, a passing human being, or the like in communication between the base station apparatus 3 and the terminal apparatus 1.

Beam management may include beam selection and beam refinement. Note that the beam recovery may include the following procedures.

Detection of a beam failure
Discovery of a new beam
Transmission of a beam recovery request
Monitoring of a response to a beam recovery request For example, the CSI-RS or a synchronization signal (for example, SSS) in a synchronization signal block may be used or a Quasi Co-Location (QCL) assumption may be used for the terminal apparatus 1 to select the transmit beam for the base station apparatus 3.

In a case that a Long Term Property of a channel on which one symbol in one antenna port is carried may be estimated from a channel on which one symbol in the other antenna port is carried, the two antenna ports are said to be quasi co-located (QCL). The long term property of the channel includes at least one of a delay spread, a Doppler spread, a Doppler shift, an average gain, or an average delay. For example, in a case that antenna port 1 and antenna port 2 are quasi co-located (QCL) with respect to the average delay, this means that a reception timing for antenna port 2 may be estimated from a reception timing for antenna port 1.

The QCL may also be expanded to beam management. For this purpose, spatially expanded QCL may be newly defined. For example, the Long term property of a channel in spatial QCL assumption may be a arrival angle (an Angle of Arrival (AoA), a Zenith angle of Arrival (ZoA), or the like) and/or an angle spread (for example, Angle Spread of Arrival (ASA) or a Zenith angle Spread of Arrival (ZSA)), an angle of departure (AoD, ZoD, or the like) or an Angle Spread of the angle of departure (for example, an Angle Spread of Departure (ASD) or a Zenith angle Spread of Departure (ZSS)), or Spatial Correlation, in a radio link or channel.

According to this method, operation of the base station apparatus 3 and the terminal apparatus 1 equivalent to beam management may be defined as beam management based on the spatial QCL assumption and radio resources (time and/or frequency).

The subframe will now be described. The subframe in the present embodiment may also be referred to as a resource unit, a radio frame, a time period, or a time interval.

Figure 2:
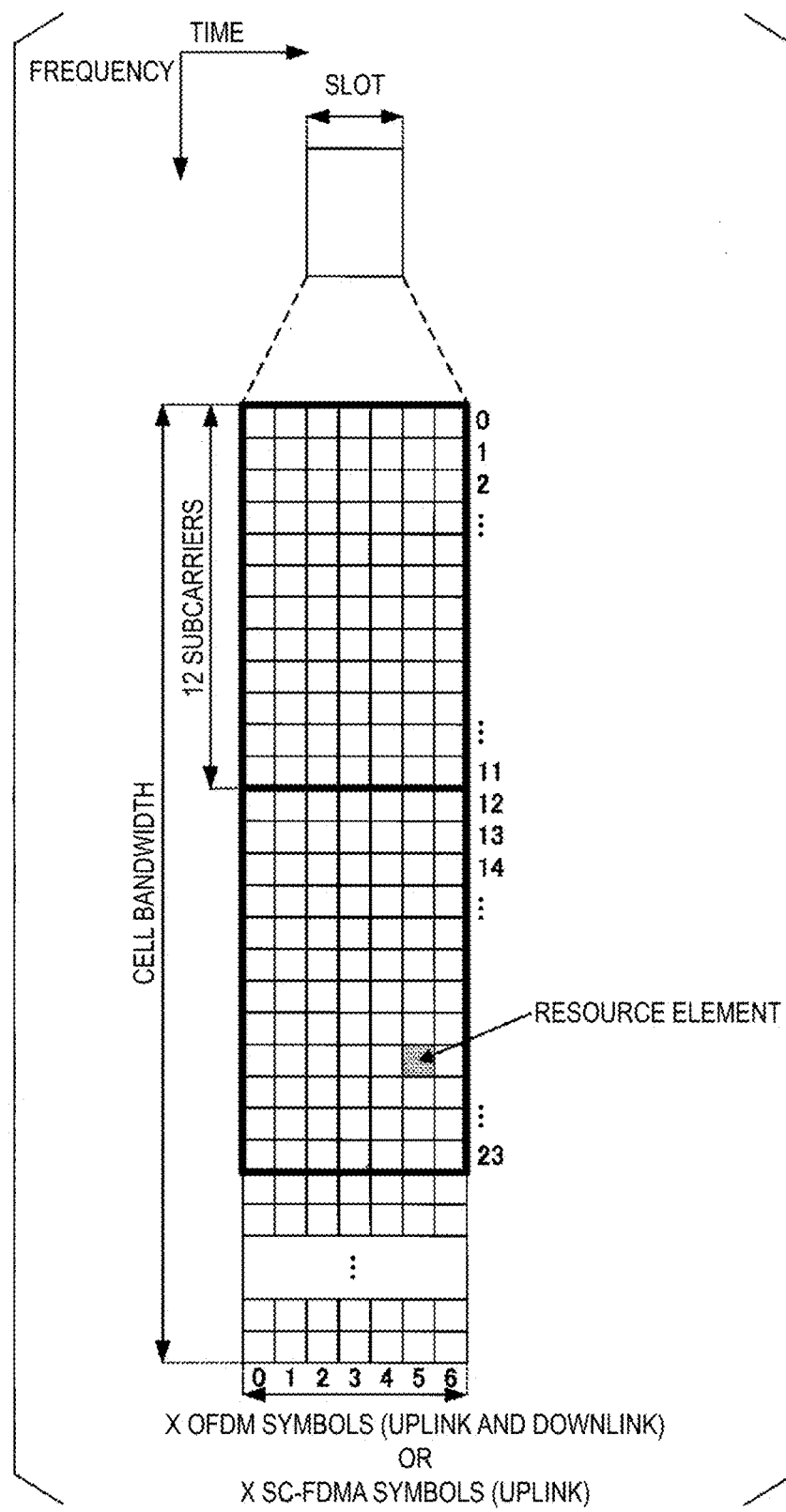
FIG. 2 is a diagram illustrating a schematic configuration of a downlink slot according to the present embodiment.

FIG. 2 is a diagram illustrating a schematic configuration of a downlink slot according to a first embodiment of the present invention. Each of the radio frames is 10 ms in length. Furthermore, each of the radio frames includes 10 subframes and X slots. In other words, the length of one subframe is 1 ms. For each of the slots, time length is defined based on subcarrier spacings. For example, in a case that the subcarrier spacing of an OFDM symbol is 15 kHz and Normal Cyclic Prefixes (NCPs) are used, X=7 or X=14, and X=7 ad X=14 correspond to 0.5 ms and 1 ms, respectively. In a case that the subcarrier spacing is 60 kHz, X=7 or X=14, and X=7 and X=14 correspond to 0.125 ms and 0.25 ms, respectively. FIG. 2 illustrates a case of X=7 as an example. Note that a case of X=14 can be similarly configured by expanding the case of X=7. The uplink slot may be defined similarly, and the downlink slot and the uplink slot may be defined separately.

The signal or the physical channel transmitted in each of the slots may be represented by a resource grid. The resource grid is defined by multiple subcarriers and multiple OFDM symbols. The number of subcarriers constituting one slot depends on each of the downlink and uplink bandwidths of a cell. Each element within the resource grid is referred to as a resource element. The resource element may be identified by using a subcarrier number and an OFDM symbol number.

A resource block is used to represent mapping of a certain physical downlink channel (such as the PDSCH) or an uplink channel (such as the PUSCH) to resource elements. As the resource block, a virtual resource block and a physical resource block are defined. A certain physical uplink channel is first mapped to a virtual resource block. Thereafter, the virtual resource block is mapped to a physical resource block. In a case that the number X of OFDM symbols included in a slot is 7 and NCPs are used, one physical resource block is defined by 7 consecutive OFDM symbols in the time domain and by 12 consecutive subcarriers in the frequency domain. Hence, one physical resource block includes (7×12) resource elements. In a case of Extended CPs (ECPs), one physical resource block is defined, for example, by 6 consecutive OFDM symbols in the time domain and by 12 consecutive subcarriers in the frequency domain. Hence, one physical resource block includes (6×12) resource elements. In this case, one physical resource block corresponds to one slot in the time domain and corresponds to 180 kHz in the frequency domain in a case of a subcarrier spacing of 15 kHz (720 kHz in a case of 60 kHz). Physical resource blocks are numbered from 0 in the frequency domain.

Figure 3:
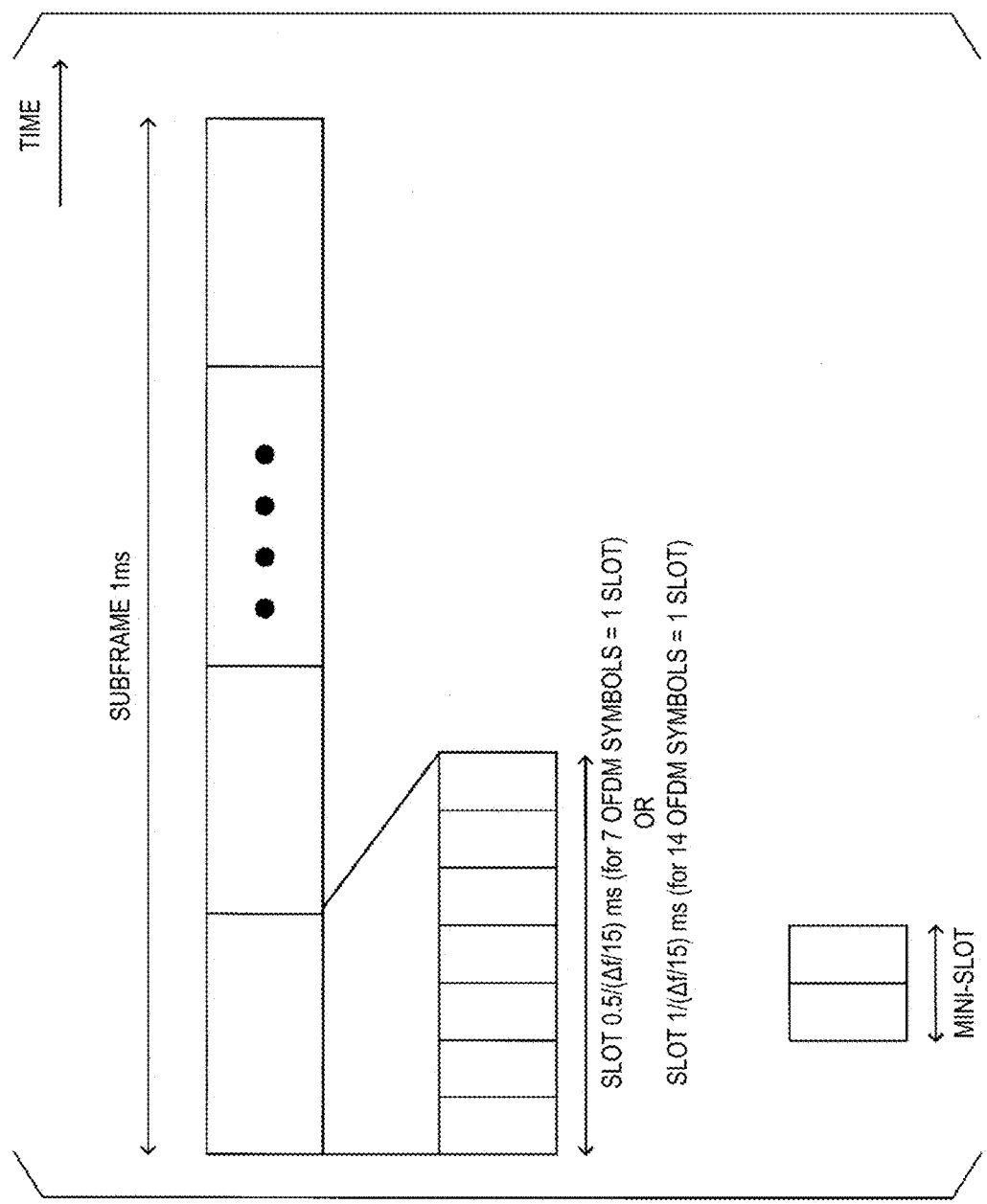
FIG. 3 is a diagram illustrating a relationship between a subframe and a slot and a mini-slot in a time domain.

The subframe, the slot, and a mini-slot will now be described. FIG. 3 is a diagram illustrating the relationship between the subframe and the slot and the mini-slot in the time domain. As illustrated in FIG. 3, three types of time units are defined. The subframe is 1 ms regardless of the subcarrier spacing. The number of OFDM symbols included in the slot is 7 or 14, and the slot length depends on the subcarrier spacing. Here, in a case that the subcarrier spacing is 15 kHz, 14 OFDM symbols are included in one subframe. Thus, with the assumption that the subcarrier spacing is Δf (kHz), the slot length may be defined as 0.5/(Δf/15) ms in a case that the number of OFDM symbols constituting one slot is 7. Here, Δf may be defined by subcarrier spacing (kHz). In a case that the number of OFDM symbols constituting one slot is 7, the slot length may be defined as 1/(Δf/15) ms. Here, Δf may be defined by subcarrier spacing (kHz). The slot length may be defined as X/14/(Δf/15) ms, where X is the number of OFDM symbols included in the slot.

Figure 4:
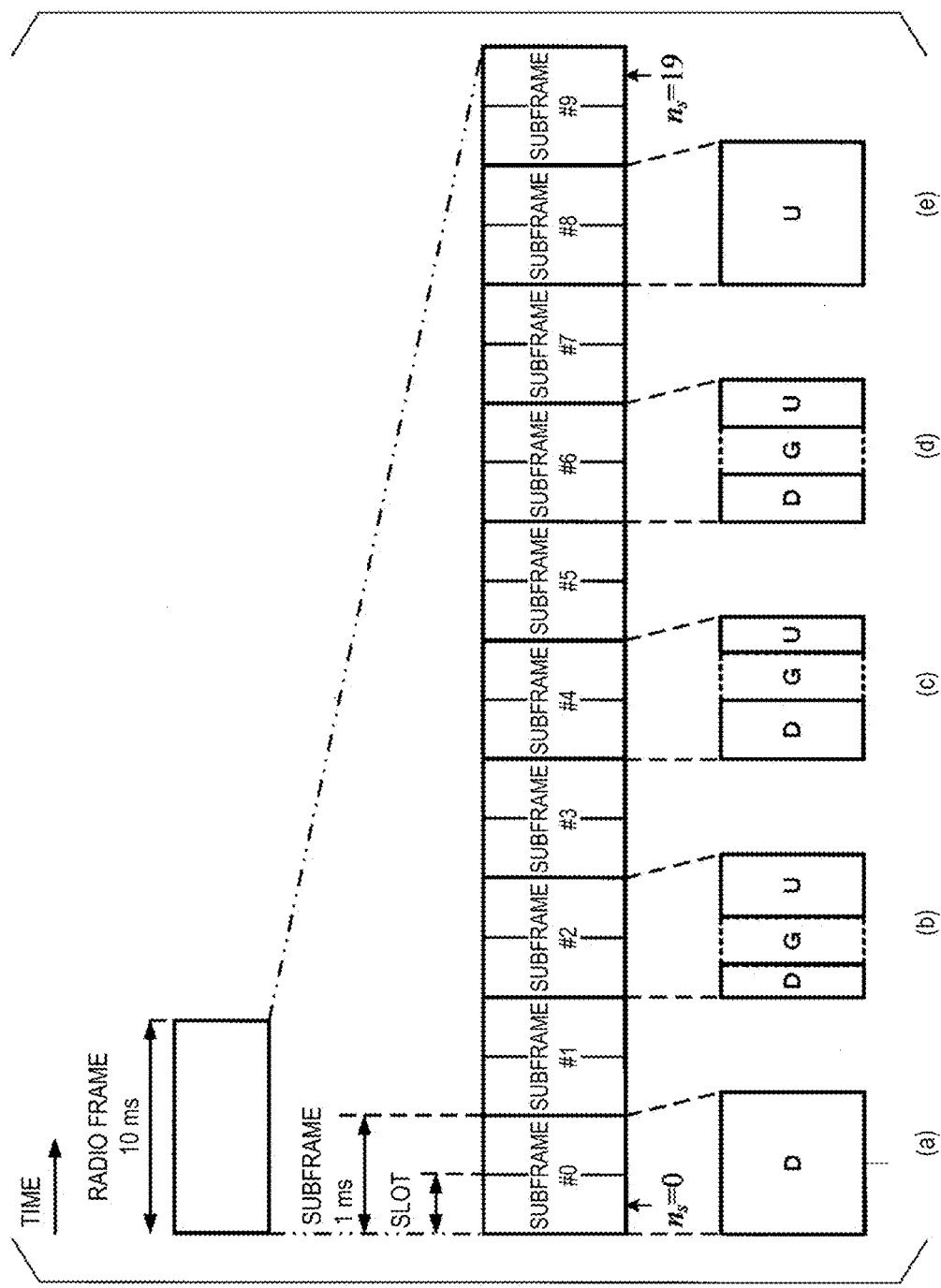
FIG. 4 is a diagram illustrating examples of a slot or a subframe.

The mini-slot (which may be referred to as a sub-slot) is a time unit including OFDM symbols that are less in number than the OFDM symbols included in the slot. FIG. 3 illustrates, by way of example, a case in which the mini-slot includes two OFDM symbols. The OFDM symbols in the mini-slot may match the timing for the OFDM symbols constituting the slot. Note that the minimum unit of scheduling may be a slot or a mini-slot. FIG. 4 is a diagram illustrating examples of the slot or the subframe. Here, a case in which the slot length is 0.5 ms at a subcarrier spacing of 15 kHz is illustrated as an example. In FIG. 4, D represents the downlink, and U represents the uplink. As illustrated in FIG. 4, during a certain time period (for example, the minimum time period to be allocated to one UE in the system), the subframe may include at least one of the followings:

downlink part (duration), gap, or uplink part (duration).

A subframe (a) of FIG. 4 illustrates an example in which, during a certain time period (also referred to as, e.g., a minimum unit of time resource that can be allocated to one UE, a time unit, or the like. Additionally, a bundle of multiple minimum units of time resources may be referred to as a time unit), all of the time resources are used for downlink transmission, and a subframe (b) of FIG. 4 illustrates that the initial time resource is used for uplink scheduling, for example, via the PCCH and that an uplink signal is transmitted after a gap for a PCCH processing delay, a time for switching from a downlink to an uplink, and transmission of an uplink signal via a gap for generation of a transmit signal. A subframe (c) of FIG. 4 is used for transmitting a downlink PCCH and/or downlink PSCH by using the first time resource, and is used for transmitting the PSCH or PCCH after a gap for a processing delay, a time for switching from a downlink to an uplink, and generation of a transmit signal. Here, for example, the uplink signal may be used to transmit the HARQ-ACK and/or CSI, namely, the UCI. A subframe (d) of FIG. 4 is used for transmitting a downlink PCCH and/or a downlink PSCH by using the first time resource, and is used for transmitting an uplink PSCH or PCCH after a gap for a processing delay, a time for switching from a downlink to an uplink, and generation of a transmit signal. Here, for example, the uplink signal may be used to transmit the uplink data, namely, the UL-SCH. A subframe (e) of FIG. 4 is an example in which the entire subframe is used for uplink transmission (uplink PSCH or PCCH).

The above-described downlink part and uplink part may include multiple OFDM symbols as is the case with LTE.

Figure 5:
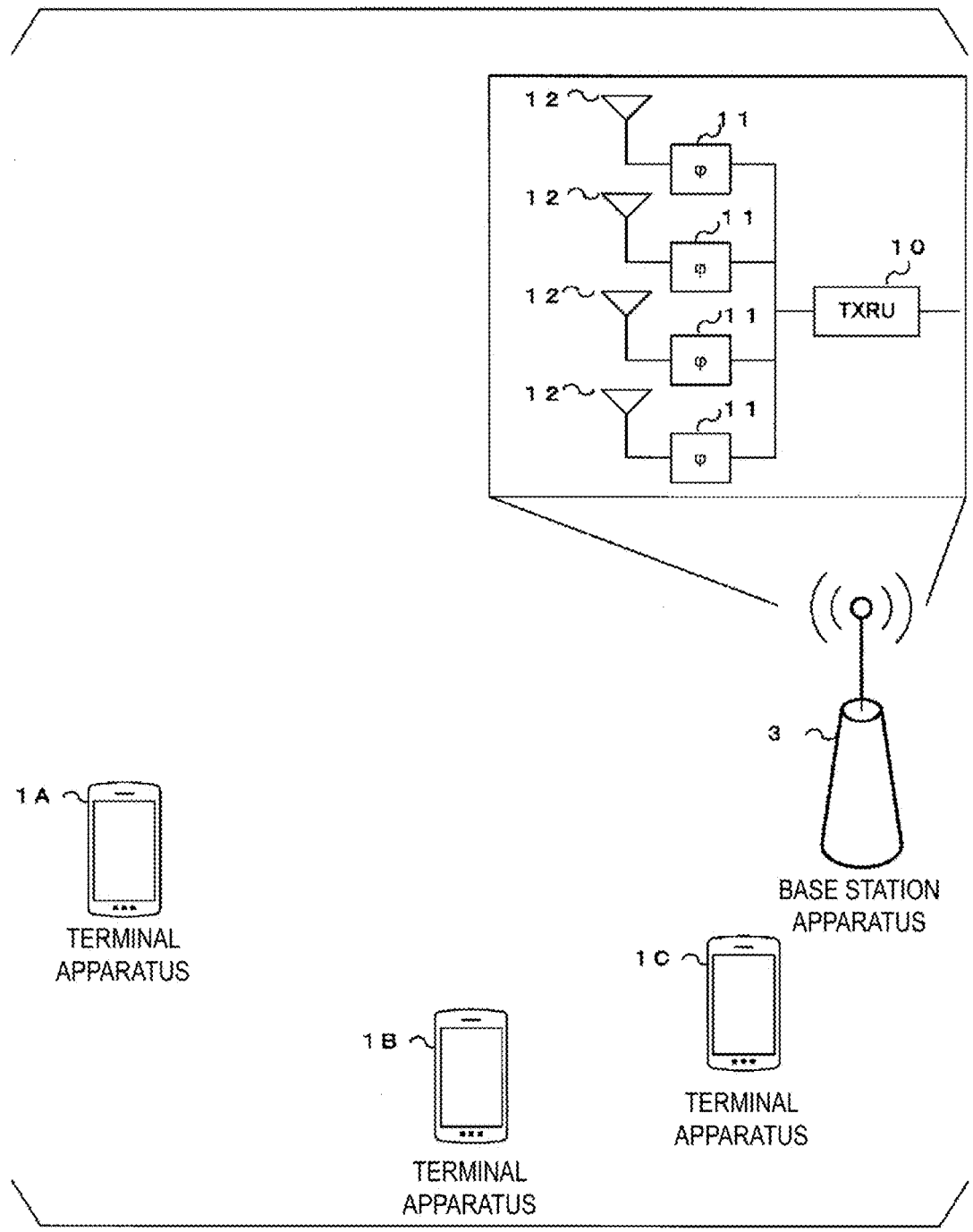
FIG. 5 is a diagram illustrating an example of beamforming.

FIG. 5 is a diagram illustrating an example of beamforming. Multiple antenna elements are connected to one Transceiver unit (TXRU) 10. The phase is controlled by using a phase shifter 11 for each antenna element and a transmission is performed from an antenna element 12, thus allowing a beam for a transmit signal to be directed in any direction. Typically, the TXRU may be defined as an antenna port, and only the antenna port may be defined for the terminal apparatus 1. Controlling the phase shifter 11 allows setting of directivity in any direction. Thus, the base station apparatus 3 can communicate with the terminal apparatus 1 by using a high gain beam.

Figure 6:
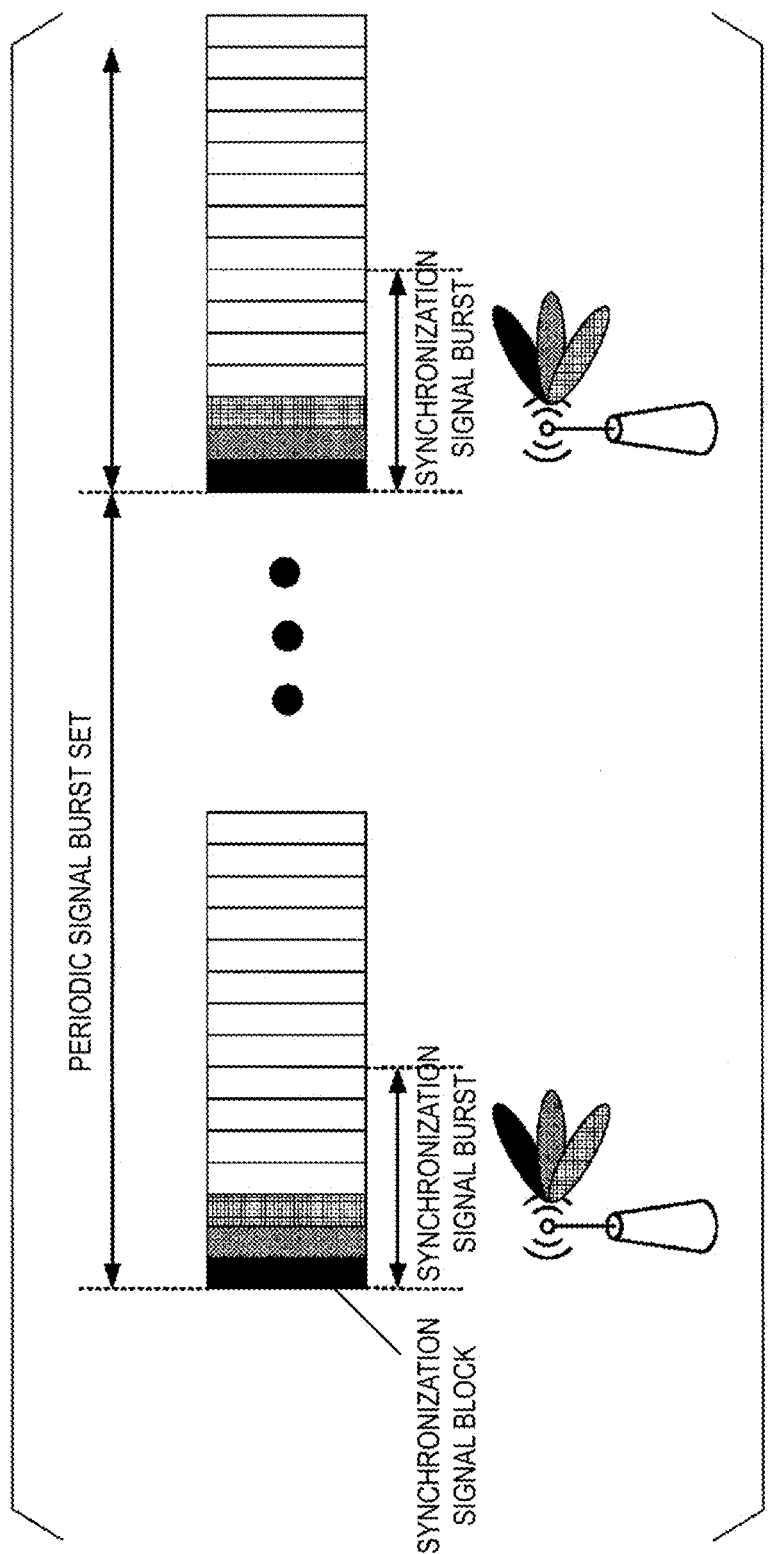
FIG. 6 is a diagram illustrating an example of a synchronization signal block, a synchronization signal burst, and a synchronization signal burst set.

FIG. 6 is a diagram illustrating an example of a synchronization signal block, a synchronization signal burst, and a synchronization signal burst set. FIG. 6 illustrates an example in which a synchronization signal burst set includes one synchronization signal burst, one synchronization signal burst includes three synchronization signal blocks, and each synchronization signal block includes one OFDM symbol.

The synchronization signal burst set includes at least one synchronization signal burst, and one synchronization signal burst includes at least one synchronization signal block. The synchronization signal block includes a time unit including one or more consecutive OFDM symbols. Note that the time unit included in the synchronization signal block may be shorter than the OFDM symbol length.

The synchronization signal burst set may be transmitted periodically. For example, a periodicity used for initial access and a periodicity configured for a connected (Connected or RRC_Connected) terminal apparatus may be defined. The periodicity configured for the connected (Connected or RRC_Connected) terminal apparatus may be configured in the RRC layer. The periodicity configured for the connected (Connected or RRC_Connected) terminal may be a periodicity of a radio resource in the time domain during which transmission is potentially to be performed, and in practice, whether the transmission is to be performed during the periodicity may be determined by the base station apparatus 3. The periodicity used for the initial access may be predefined in specifications or the like.

The subcarrier spacing for the PSS and/or the SSS used for the initial access is predefined in the specifications, and a synchronization signal burst set configured for a connected terminal apparatus may be determined, based on a System Frame Number (SFN). Furthermore, a starting position of the synchronization signal burst set (boundary) may be determined based on the SFN and the periodicity.

The same beam may be assumed to be applied to synchronization signal bursts or synchronization signal blocks having the same relative time within each of multiple synchronization signal burst sets. Antenna ports for synchronization signal bursts or synchronization signal blocks having the same relative time within each of multiple synchronization signal burst sets may be assumed to be quasi co-located (QCL) with respect to the average delay, the Doppler shift, and the spatial correlation.

Among the multiple synchronization signal burst sets, the relative time position at which the synchronization signal burst is mapped may be fixed.

The synchronization signal burst may include at least one synchronization signal block in the synchronization signal burst. An antenna port for a synchronization signal block at a certain relative time within a synchronization signal burst may be assumed to be quasi co-located (QCL) with an antenna port for a synchronization signal block at the same relative time within another synchronization signal burst with respect to the average delay, the Doppler shift, and the spatial correlation.

In a case that multiple synchronization signal bursts are included in a synchronization signal burst set, the relative time intervals between the multiple synchronization signal bursts in the synchronization signal burst set may be fixed. For example, in a case that a synchronization signal burst set has a periodicity of 15 ms and three synchronization signal bursts are included in the burst set, synchronization signal bursts may be mapped at intervals of 5 ms.

The synchronization signal block may include at least one of the PSS, the SSS, or the PBCH. The PSS, SSS, and PBCH may be multiplexed in the time domain (TDM) or multiplexed in the frequency domain (FDM). At least one of the PSS, SSS, or PBCH may be included in the synchronization signal block.

Figure 7:
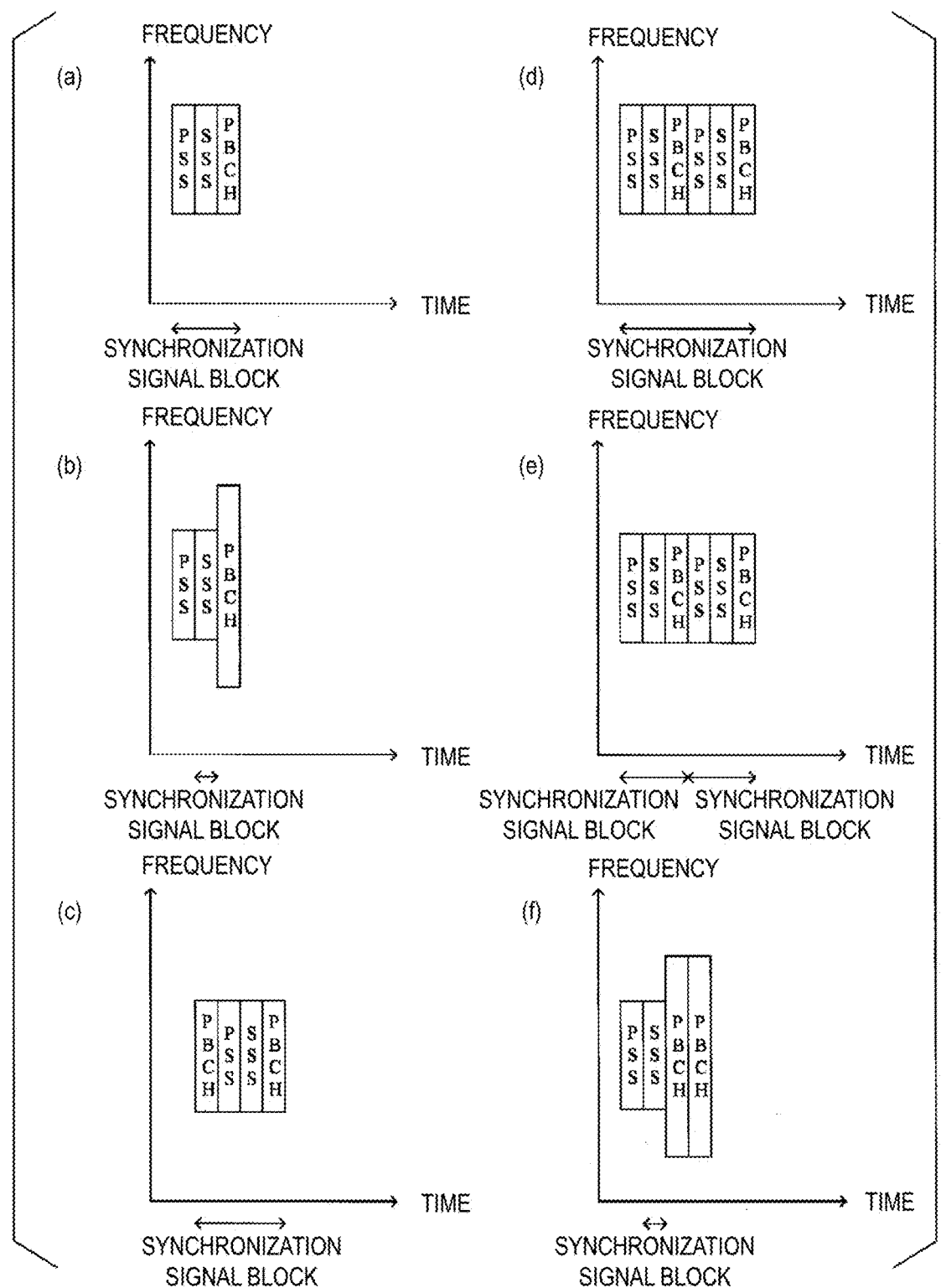
FIG. 7 is a diagram illustrating examples of a multiplexing method for PSS, SSS, and PBCH in a synchronization signal block.

FIG. 7 is a diagram illustrating examples of a multiplexing method for the PSS, SSS, and PBCH in the synchronization signal block. FIG. 7(a) is a diagram illustrating an example in which one PSS, one SSS, and one PBCH are time-multiplexed in one synchronization signal block. FIG. 7(b) illustrates a case in which a PSS, an SSS, a PBCH are time-multiplexed in one synchronization signal block and a wide bandwidth is used for a PBCH (e.g., the number of PBCH subcarriers or resource elements is larger than the number of PSSs and/or SSSs). FIG. 7(c) is a diagram illustrating an example in which a PBCH, a PSS, an SSS, and a PBCH are time-multiplexed in one synchronization signal block. Here, the first PBCH and the last PBCH in the synchronization signal block may be the same. The temporal order of the PSS, the SSS, and the PBCHs may be the PSS, the SSS, the PBCH, and the PBCH. FIG. 7(d) is a diagram illustrating an example in which the same signal sequence is transmitted twice in the order of a PSS, an SSS, and a PBCH within one synchronization signal block. Note that the PSS, SSS, and PBCH may be defined as being mapped to multiple time and/or frequency resources. The PSS, SSS, and PBCH may be defined as being repeated X times (X=2 in the example of FIG. 7(d)) within the synchronization signal block. The PSS, SSS, and PBCH may be defined as being retransmitted Y times (Y=1 in the example of FIG. 7(d)). The PSS, SSS, and PBCH may be defined as being retransmitted. In FIG. 7(e), the PSS, SSS, and PBCH are time-multiplexed in one synchronization signal block, and the same PSS, SSS, and PBCH are multiplexed in the next synchronization signal block. In this case, the synchronization signal block may be defined as being repeated X times (X=2 in the example of FIG. 7(e)). The synchronization signal block may be defined as being retransmitted Y times (Y=1 in the example of FIG. 7(e)). Note that one synchronization signal block may be defined as being mapped to multiple time and/or frequency resources. FIG. 7(f) is a diagram illustrating an example in which a PSS, an SSS, and PBCHs are time-multiplexed in one synchronization signal block, and the PBCH transmitted with a bandwidth greater than the bandwidth of PSS and/or SSS is time-multiplexed for two symbols. Time multiplexing and frequency multiplexing may be defined in combination. For example, the multiplexing method may be such that the PSS and SSS are frequency-multiplexed, whereas the PSS/SSS and PBCH are time-multiplexed. These are merely examples and may be applied in combination to any signal and channel. In a case of time multiplexing, the radio resources may be consecutive or inconsecutive. In a case of frequency multiplexing, the radio resources may be allocated at consecutive or inconsecutive frequency positions.

The number of synchronization signal blocks may be defined, for example, as the number of synchronization signal blocks within the synchronization signal burst, or within the synchronization signal burst set, or within the periodicity of synchronization signal blocks. The number of synchronization signal blocks may indicate the number of beam groups for cell selection within the synchronization signal burst, within the synchronization signal burst set, or within the periodicity of synchronization signal blocks. Here, the beam group may be defined as the number of synchronization signal blocks included in the synchronization signal burst, or in the synchronization signal burst set, or in the periodicity of synchronization signal blocks, or may be the number of different beams.

In a case that different beams are used for synchronization signal blocks transmitted using any two antenna ports, the two antenna ports may be defined as not being quasi co-located (QCL) for spatial parameters, the antenna ports being used for transmission of synchronization signal blocks within the synchronization signal burst, or within the synchronization signal burst set, or within the periodicity of synchronization signal blocks. The beam may also be defined as a transmit or receive Filter Configuration.

The spatial parameters may include at least one or more of the following:

Spatial Correlation

Reception angle (Angle of Arrival (AoA) and/or Zenith angle of Arrival (ZoA))

Reception angle spread (Angle Spread of Arrival (ASA) and/or Zenith angle Spread of Arrival (ZSD))

Departure angle (Angle of Departure (AoD) and/or Zenith angle of Departure (ZoD))

Departure angle spread (Angle Spread of Departure (ASD) and/or Zenith angle Spread of Departure (ZSD))

The synchronization signal blocks may indicate the number of beams within the beam group or the synchronization signal burst or within the synchronization signal burst set or within the periodicity of synchronization signal blocks. For example, in FIG. 7(a), FIG. 7(b), FIG. 7(c), FIG. 7(d), and FIG. 7(f), in a case that one beam is applied in the synchronization signal block, the number of beams within the synchronization signal burst, or within the synchronization signal burst set, or within the periodicity of synchronization signal blocks corresponds to the number of synchronization signal blocks transmitted in the synchronization signal burst. In FIG. 7(e), the synchronization signal blocks are transmitted twice by using the same beam, and thus, the number of beams may be the number of synchronization signal blocks/2.

The number of synchronization signal blocks within the synchronization signal burst predefined in the specifications may indicate the maximum value of the number of potential synchronization signal blocks within the synchronization signal burst. A synchronization signal burst time length predefined in the specifications may be defined with an integer multiple of a slot length or a subframe length, or may be defined based on a slot length or a subframe length such as half or one third of the slot length or the subframe length. The synchronization signal burst time length may be defined based on the OFDM symbol length or the minimum time (Ts) instead of the slot length or the subframe length.

Now, a method for indicating the number of synchronization signal blocks in the synchronization signal burst will be described. The number of synchronization signal blocks may be indicated to the terminal apparatus 1 by using an identity for generating the PSS and/or SSS.

The PSS and SSS are generated by an M sequence or a gold sequence (which may be a PN sequence). In this case, an initial value of a shift register may be determined based at least on the number of synchronization signal blocks in the synchronization signal burst. The initial value of the shift register may be further based on the cell ID or a value based on the cell ID.

In a case that the PSS and/or SSS further includes a cover code (for example, a cyclic shift or a Hadamard sequence), a parameter for determining the amount of cyclic shift or a row index of the Hadamard sequence may be determined based at least on the number of synchronization signal blocks within the synchronization signal burst. The parameter for determining the amount of cyclic shift or the row index of the Hadamard sequence may be further based on the cell ID or the value based on the cell ID.

The number of synchronization signal blocks within the synchronization signal burst may be included in MIB transmitted in the PBCH or system information.

The terminal apparatus 1 measures the reception quality (for example, RSRP, RSRQ, RS-SINR, and the like obtained by RRM measurement) in a cell, based on the number of synchronization signal blocks in the synchronization signal burst. In this case, measured values may be averaged among the synchronization signal blocks in the synchronization signal burst.

The measurement for cell selection may be an average value for X (X may be 1. X may be an integer larger than or equal to 2) synchronization signal blocks in the synchronization signal burst. In this case, the number of synchronization signal blocks in the synchronization signal burst need not be indicated.

In this way, bits can be reduced by indicating only the number of multiple synchronization signal blocks instead of indicating the configuration of the synchronization signal blocks.

The MIB transmitted on the PBCH may include time indexes of synchronization signal blocks within the synchronization signal burst, within the synchronization signal burst set, or within the periodicity of synchronization signal blocks. Dedicated RRC signaling may be used to indicate the time indexes of synchronization signal blocks within the synchronization signal burst, within the synchronization signal burst set, or within the periodicity of synchronization signal blocks.

The time indexes may be indicated by using the ID of a third signal (e.g., a Tertiary Synchronization Signal (TSS) or a cell-specific Channel State Information Reference Signal (CSI-RS). Here, the cell-specific CSI-RS may be signaled with the MIB included in the PBCH or the SIB included in the PDSCH (e.g., may be one or more of the parameters including the periodicity of CSI-RS, resources (including time, frequency, and code), and the number of antenna ports). Note that the TSS to be transmitted may be time-multiplexed or frequency-multiplexed with the PSS, SSS, and PBCH in the synchronization signal block. The TSS may also be defined as a signal in the synchronization signal block. The CSI-RS may also be transmitted in the synchronization signal block.

The MIB transmitted on the PBCH may indicate a method of mapping synchronization signal blocks within the synchronization signal burst, within the synchronization signal burst set, or within the periodicity of synchronization signal blocks (local (Localized/Contiguous) or discrete (Distributed/Non-contiguous)). The mapping method may also be indicated with one bit. Information about the mapping method may be indicated by dedicated RRC signaling.

Figure 8:
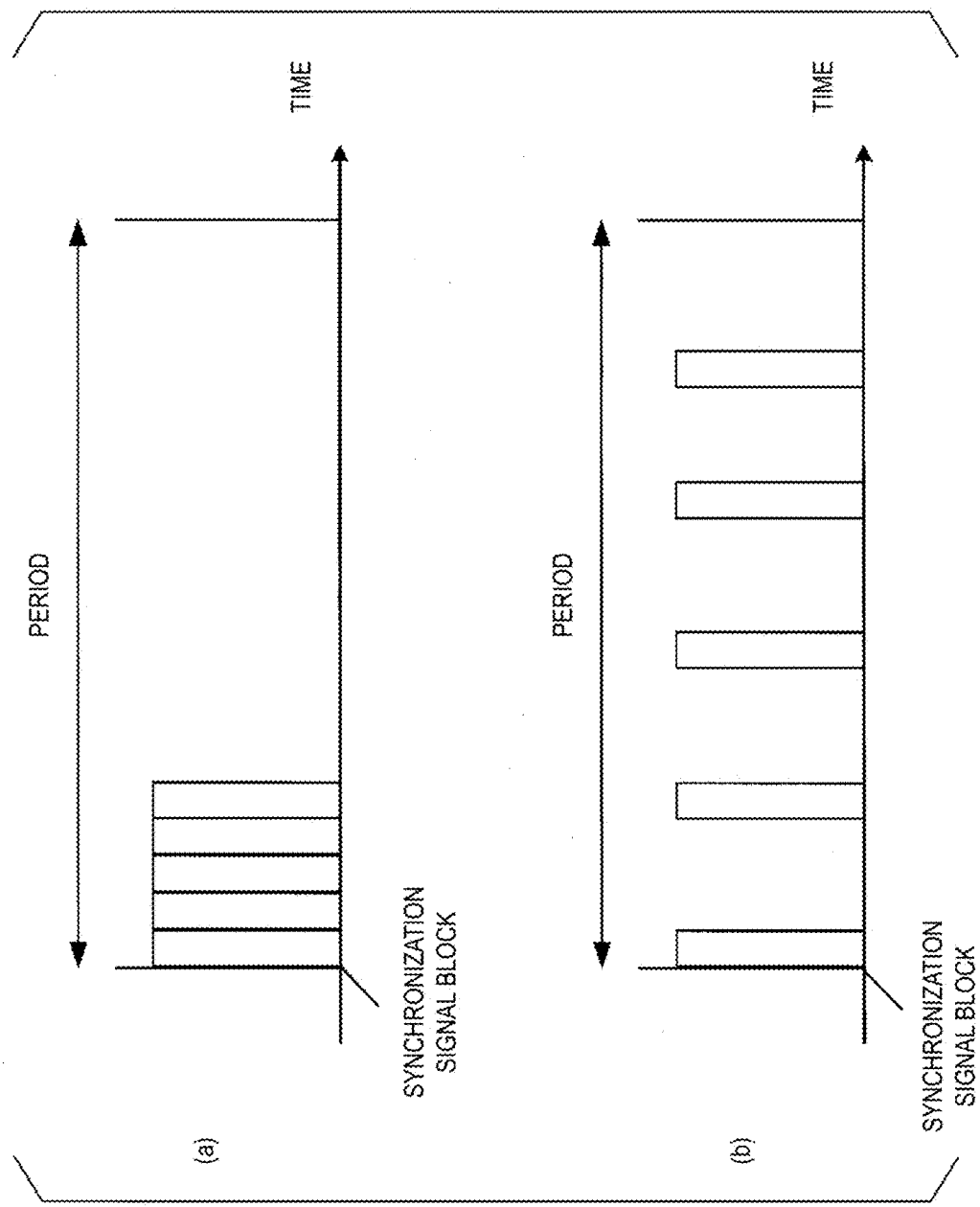
FIG. 8 is a diagram illustrating examples of mapping of synchronization signal blocks.

FIG. 8 illustrates examples of a method for mapping synchronization signal blocks. FIG. 8(*a*) illustrates an example in which synchronization signal blocks are locally mapped in a time domain starting from a boundary of a periodicity. FIG. 8(*b*) illustrates an example in which the synchronization signal blocks are discretely mapped within the periodicity in the time domain. Here, the periodicity may be configured as the periodicity of synchronization signal bursts, or the periodicity of synchronization signal burst sets, or the periodicity of synchronization signal blocks, or the periodicity of synchronization signals.

In FIG. 8(*a*), synchronization signal blocks may be temporally locally defined. For example, in a case that the number of potential synchronization signal blocks is L, the terminal apparatus 1 may assume L contiguous synchronization signal blocks. The terminal apparatus 1 may receive an indicated number of synchronization signal blocks included in the L potential synchronization signal blocks or synchronization signal blocks at indicated locations. In FIG. 8(*b*), the terminal apparatus 1 may assume temporally discretely mapped synchronization signal blocks included in the L potential synchronization signal blocks. The terminal apparatus 1 may assume an indicated number of synchronization signal blocks included in the L potential synchronization signal blocks or synchronization signal blocks at indicated locations. A synchronization signal burst including multiple synchronization signal blocks may be locally or discretely mapped. The terminal apparatus 1 may perform measurements assuming contiguous synchronization signal blocks, or may eliminate resources for the synchronization signal blocks from resource elements for the PDSCH.

The value of L may be defined in specifications. The value of L may be defined in specifications, based on the frequency band. Note that local may mean that synchronization signal blocks included in mapping candidates of synchronization signal blocks in the synchronization signal burst set or in the synchronization signal burst are locally mapped. Local may mean that synchronization signal blocks are mapped to localized slots in the synchronization signal burst set or in the synchronization signal burst. Local may mean that a synchronization signal burst or a set of multiple synchronization signal blocks is locally mapped in the synchronization signal burst set.

In FIG. 8(*b*), the time position of the synchronization signal block or the synchronization signal burst assumed by the terminal apparatus 1 may be set based on the number L of potential synchronization signal blocks or synchronization signal bursts. For example, assume that the number of OFDM symbols within one periodicity is $N_{SC}$, the number of symbols included in the synchronization signal block or the synchronization signal burst is S (in the case of the synchronization signal burst, S may be the number of OFDM symbols included in the time domain in which synchronization signal bursts are mapped), and the total number of time positions at which synchronization signal blocks or synchronization signal bursts can be mapped is $N_{SS}$, $N_{SS}$ is represented by the equation below.

$$N_{SS} = \frac{N_{SC}}{S} \qquad \text{Equation 1}$$

Of the $N_{SS}$ candidates, the time position of the potential l-th (l=0 to L−1 or l=1 to L) synchronization signal block or synchronization signal burst may be defined as in the equation below. The equation below is for an example in which the synchronization signal blocks are mapped at equal intervals. Of course, the equation may be similarly defined for synchronization signal bursts.

$$n(l) = \left\lfloor \frac{N_{SS}}{L} \right\rfloor \cdot l \qquad \text{Equation 2}$$

n(1) indicates the time position of the 1-th synchronization signal block. Note that 1 is an index for each time resource for a corresponding synchronization signal block, but may be represented as an index of an OFDM symbol or an index of a slot. An equation may be used in which the time position is defined to be aligned with a boundary of a slot (e.g., the beginning of the slot or the tail end of the slot), for the value determined by Equation 2. For example, the time position may be defined as the beginning of the slot closest to the position represented by Equation 2.

The terminal apparatus 1 may receive an indicated number of actual synchronization signal blocks included in the L synchronization signal blocks or actual synchronization signal blocks at the time position.

The time position may be defined by replacing L in Equation 2 with the indicated number of synchronization signal blocks.

Figure 9:
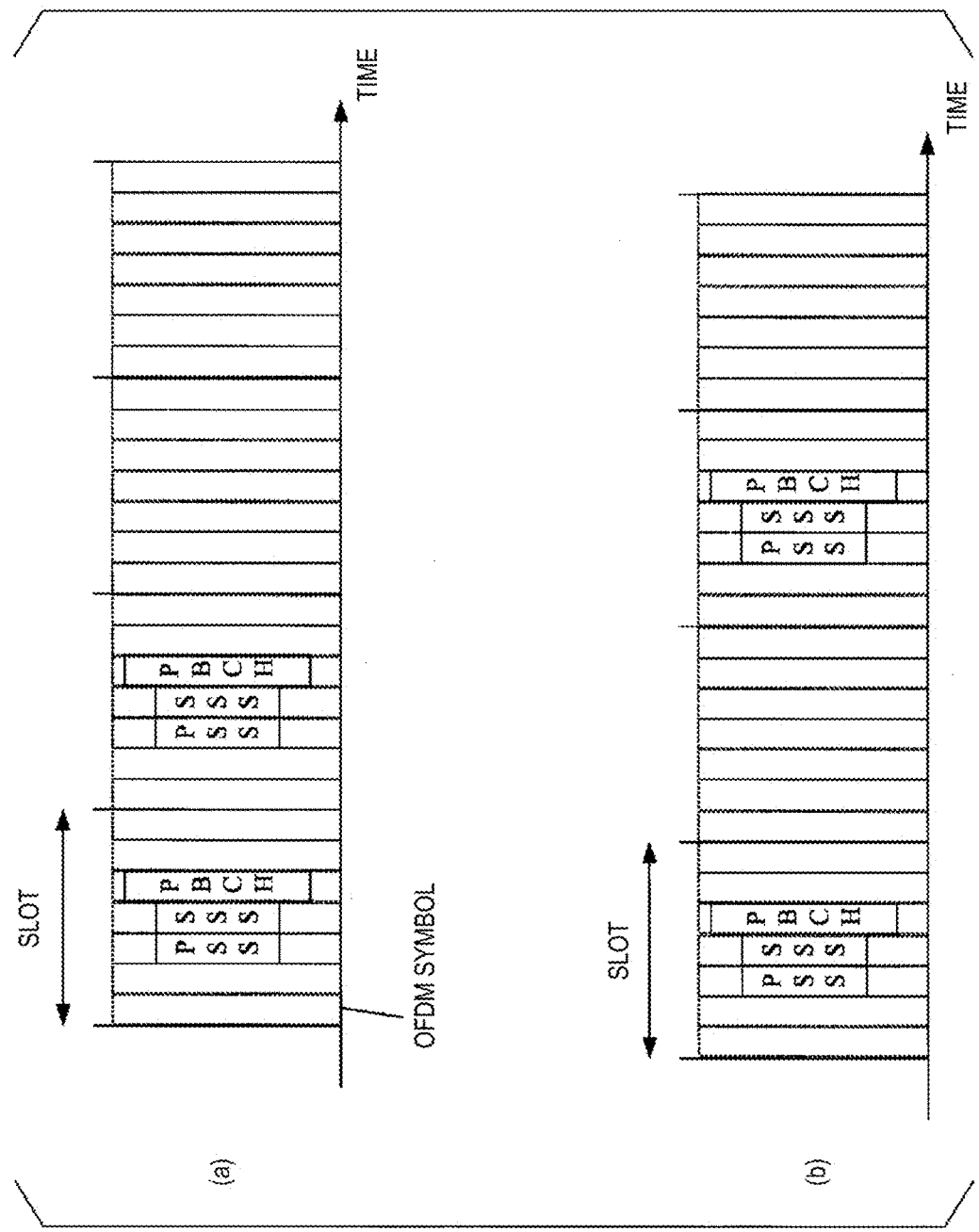
FIG. 9 is a diagram illustrating examples of synchronization signal blocks in local or discrete slots.

FIG. 9 illustrates examples in which synchronization signal blocks are mapped to local slots or discrete slots, as a configuration of a local or discrete synchronization signal blocks. FIG. 9(a) illustrates an example in which a PSS, an SSS, and a PBCH are temporally mapped in a case that local mapping is indicated. As illustrated in FIG. 9(a), one synchronization signal block is mapped to each of contiguous slots. Here, the beginning of the synchronization signal block is mapped to the third OFDM symbol in the slot. Which OFDM symbol is a symbol to which the first synchronization signal block is mapped may be defined in specifications.

FIG. 9(b) illustrates an example of mapping to discrete slots. Here, assume that the number of slots included in the periodicity of synchronization signal blocks is Nslot, the number of symbols included in the synchronization signal block is S, and the total number of time positions at which synchronization signal blocks can be mapped is $N_{SS}$, $N_{SS}$ is represented by the equation below.

$$N_{SS} = \frac{N_{slot}}{S} \quad \text{Equation 3}$$

Of the $N_{SS}$ candidates, a slot within the periodicity including the potential 1-th (1=0 to L−1 or 1=1 to L) synchronization signal block may be defined as the equation below.

$$n(l) = \left\lfloor \frac{N_{SS}}{L} \right\rfloor \cdot l \quad \text{Equation 4}$$

In this way, the time positions of synchronization signal blocks may be determined by any one or more of information indicating whether the synchronization signal blocks are local or discrete, the periodicity of synchronization signal blocks, the number of synchronization signal blocks included in the periodicity of synchronization signal blocks, and a maximum number within a predefined periodicity of synchronization signal blocks. In a case of discrete mapping, the time interval between synchronization signal blocks or the periodicity of a synchronization signal burst may be predefined as descried above, or indicated on the PBCH or with the SIB or dedicated RRC signaling.

The periodicity of the synchronization signal blocks may be a synchronization signal burst set or a synchronization signal burst. Note that the periodicity of synchronization signal blocks and the number of synchronization signal blocks included in the periodicity of synchronization signal blocks may be configured by the RRC signaling. These types of information may be indicated with the MIB included in the PBCH. In a case that the periodicity of synchronization signal blocks is not configured, a predefined periodicity (e.g., a default periodicity) may be used. The terminal apparatus 1 may assume the maximum number within the predefined periodicity of synchronization signal blocks in a case that the number of synchronization signal blocks included in the periodicity of synchronization signal blocks is not configured. Note that the function not being configured by the RRC signaling may include a case in which a message indicating that the function is not configured, or a case in which a message indicating that the function is configured is not included in the RRC signaling. A bitmap may be used for the indication of the time positions. For example, bit 1 may indicate a time position at which a synchronization signal block has been transmitted, and bit 0 may indicate a time position at which no synchronization signal block has been transmitted.

The terminal apparatus 1 may assume that bits for logical synchronization signal blocks are configured by using a bit map of length L and correspond to local or discrete physical time positions. For example, the terminal apparatus 1 may assume physical time positions, based on the bits for the synchronization signal blocks represented by using the bitmap of length L and the above-described information of the local or discrete mapping.

Although, in the example described above, the synchronization signal blocks are locally and discretely mapped, the local and discrete mapping may be achieved by using, as a unit, a synchronization signal burst or multiple synchronization signal blocks. In another possible method, for example, four synchronization signal blocks are locally mapped as one unit, and the unit is discretely mapped. The bitmap may be formed by using, as a unit, a synchronization signal burst or multiple synchronization signal blocks.

Symbols of the physical downlink shared channel are not mapped to resource elements used for (corresponding to) the time positions of the synchronization signal blocks configured as described above.

Now, PBCH scrambling will be described. Here, in the description, the periodicity of synchronization signal blocks (the periodicity of synchronization signals, the periodicity of synchronization signal bursts, or the periodicity of synchronization signal burst sets) is assumed to be 20 milliseconds, and the Transmission Time Interval (TTI) of the PBCH is assumed to be 80 milliseconds.

The coded bits of the MIB transmitted on the PBCH are scrambled by the gold sequence. Here, the M sequence (or the M sequence constituting the gold sequence) may be initialized every 80 milliseconds by the cell ID. For example, in a case that a System Frame Number (SFN) is assumed to be $n_f$, the M sequence may be initialized by using the cell ID detected in the PSS or SSS in each frame satisfying $n_f$ mod 8=0.

The coded bits of the MIB code bits transmitted on the PBCH are scrambled by the gold sequence. Here, the M sequence (or the M sequence constituting the gold sequence) may be initialized every 80 milliseconds by using the cell ID and the time indexes of the synchronization signal blocks.

A synchronization signal block ID (SS block identifier) may be defined by using the time index or ID of each synchronization signal block, based on the cell ID detected in the PSS and SSS and the TSS or the PBCH, and the M sequence may be initialized by the synchronization signal block ID.

Figure 10:
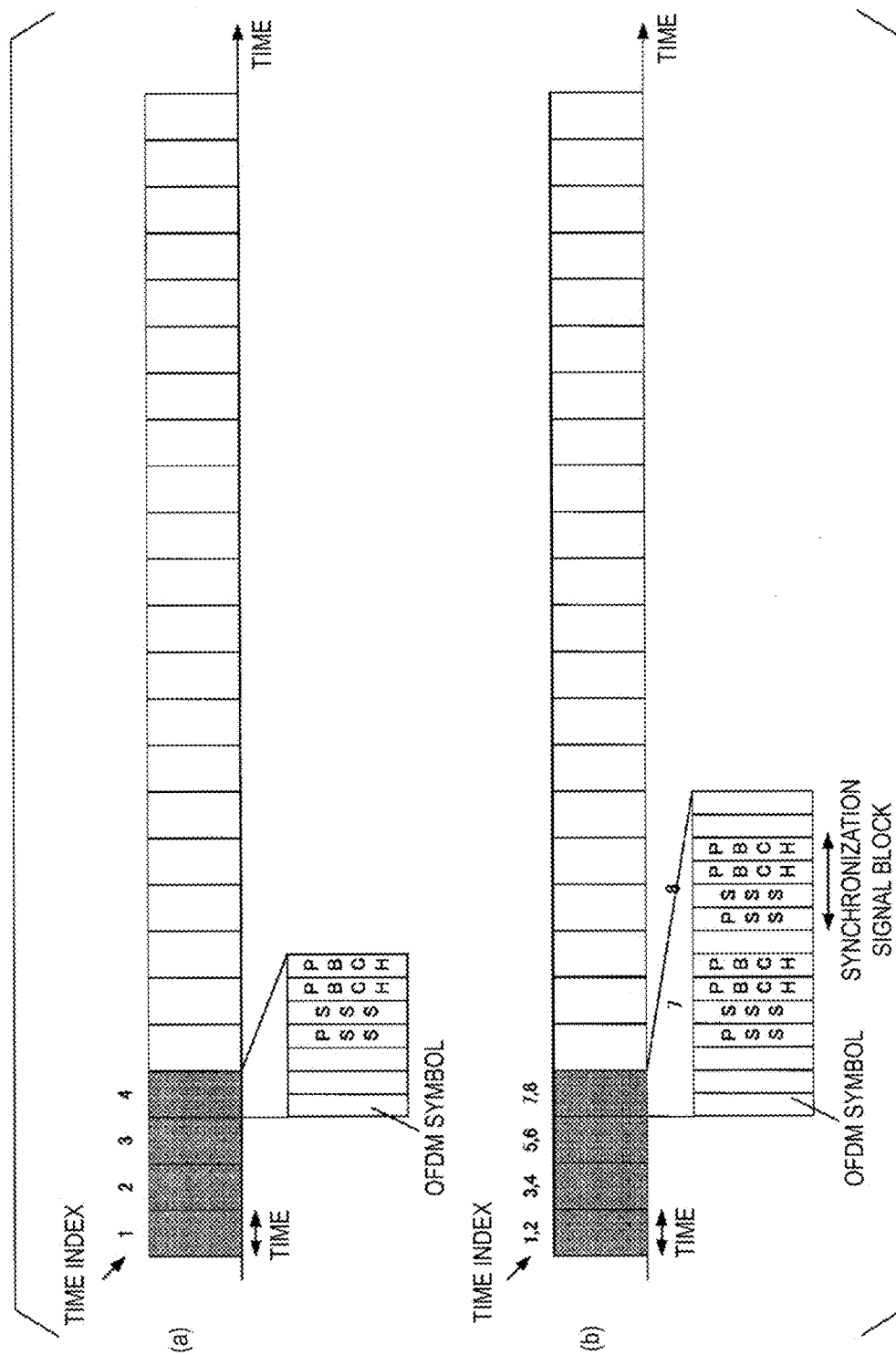
FIG. 10 is a diagram illustrating examples of a relationship between time indexes and slots.

FIG. 10 illustrates examples of a relationship between time indexes and slots related to the time positions of synchronization signal blocks in a case that the synchronization signal is locally transmitted. FIG. 10(a) illustrates an example in which one synchronization signal block is mapped in one slot and in which four synchronization signal blocks are mapped in four slots. Thus, in a case that one synchronization signal block is mapped in one slot, the index is determined for each slot or for each synchronization signal block in the slot, for the time index. FIG. 10(b) illustrates an example in which multiple synchronization signal blocks can be mapped in one slot, and eight synchronization signal blocks are mapped in four slots. In the example in FIG. 10(b), two synchronization signal blocks are mapped in one slot and indexed from the beginning in sequence. In this way, the time index may indicate the ID of each synchronization signal block and may be defined as an indication of the index of a beam.

The time position of the synchronization signal block (synchronization signal) may be a slot index, the time position of the slot or a time position within the slot, or the time index of the synchronization signal block.

Now, an example in which the base station apparatus 3 configures the above-described TSS in the terminal apparatus 1 will be described. In initial access, the terminal apparatus 1 receives synchronization signal blocks with a predefined periodicity (e.g., 20 milliseconds) periodicity. After the terminal apparatus 1 camps on or connects to the base station apparatus 3, the base station apparatus 3 may indicate the periodicity of synchronization signal blocks (or synchronization signal bursts or synchronization signal burst sets) actually transmitted by the network.

At this time, the base station apparatus 3 may configure whether the TSS is included in the synchronization signal blocks. For example, in a handover, in a case that the terminal apparatus 1 performs RRM measurements related to another cell (for example, Reference Signal Received Power (RSRP) and Reference Signal Received Quality (RSRQ), Synchronization Signal Reference Signal Reception Power (SS-RSRP), and CSI-RSRP (CSI-RS RSRP)), the terminal apparatus 1 can detect the time index or synchronization signal block ID of each synchronization signal block by using the TSS without decoding the PBCH.

Note that reception of the synchronization signal blocks of the other cell by using the TSS may be configured via the RRC signaling, or may be indicated to the terminal apparatus 1 by a broadcast signal.

In a case that the TSS is multiplexed in a time-multiplexing manner, any one of the following orders (order of the OFDM symbol number) may be used for the multiplexing in the synchronization signal blocks.

PSS, SSS, PBCH, TSS
PSS, PBCH, SSS, TSS
SSS, PSS, PBCH, TSS
SSS, PBCH, PSS, TSS
PBCH, PSS, SSS, TSS
PBCH, SSS, PSS, TSS
TSS, PSS, SSS, PBCH
TSS, PSS, PBCH, SSS
TSS, SSS, PSS, PBCH
TSS, SSS, PBCH, PSS
TSS, PBCH, PSS, SSS
TSS, PBCH, SSS, PSS

Note that, in a case that the PBCH is provided in multiple symbols, the PBCH may be allocated to contiguous symbols, or may be allocated at temporally distant positions within the synchronization signal block. For example, the PBCH may be allocated in the order of the PBCH, the PSS, the SSS, and the PBCH.

Figure 11:
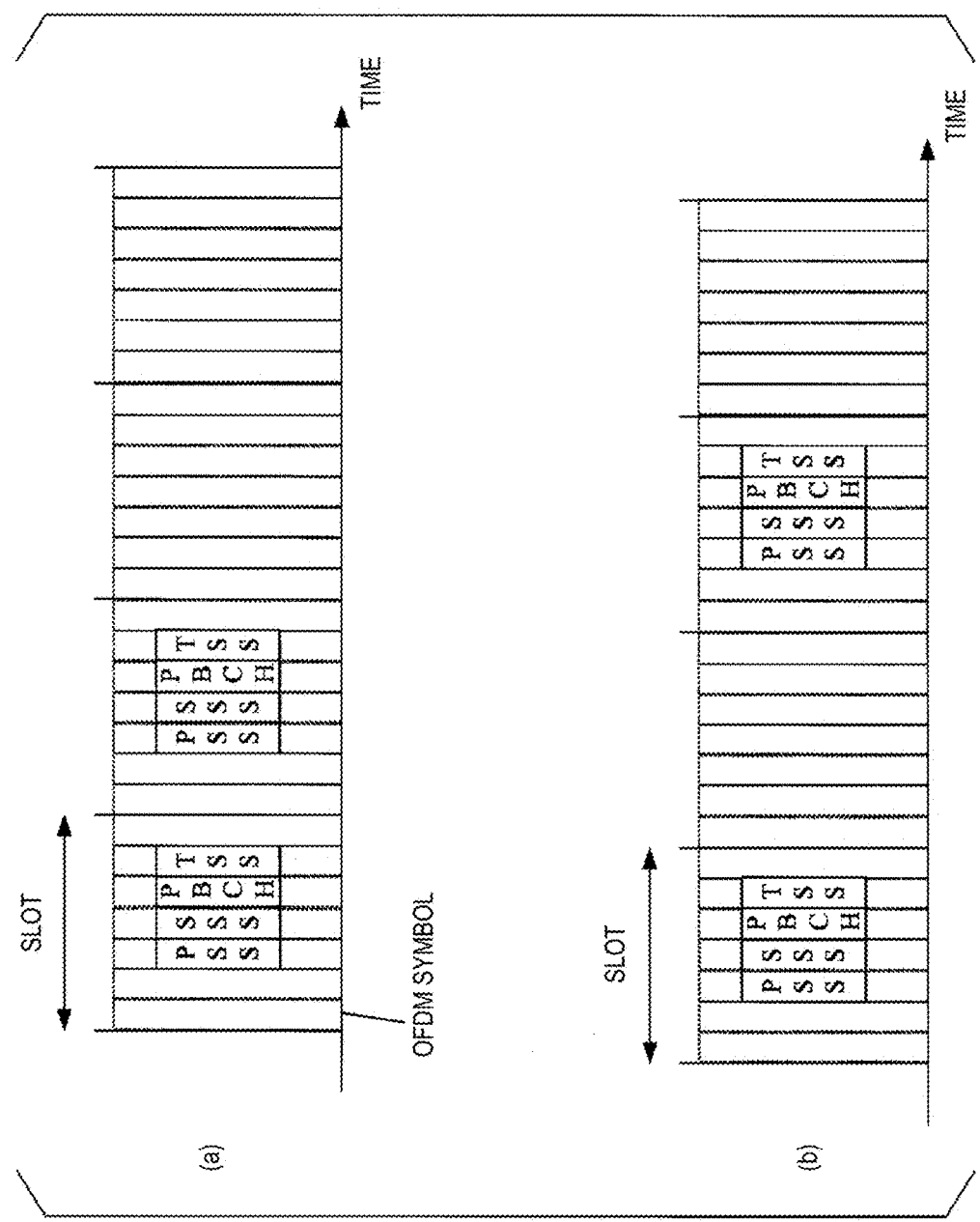
FIG. 11 is a diagram illustrating examples of local or discrete synchronization signal blocks multiplexed with TSSs.

FIG. 11 illustrates examples in which the TSS is multiplexed. FIG. 11(a) illustrates an example of local mapping of synchronization signal blocks, and FIG. 11(b) illustrates an example of discrete mapping of synchronization signal blocks. In this way, by configuration of the TSS for the terminal apparatus 1 for handover, the terminal apparatus 1 can measure the reception quality of the synchronization signal blocks without decoding of PBCH.

Here, the terminal apparatus 1 may perform initial access only with the PSS, the SSS, and the PBCH, and measure the reception quality in the serving cell corresponding to the frequency corresponding to a measurement object by using the PSS, SSS, and TSS in the synchronization signal block with the TSS configured at the time of handover.

The TSS and the CSI-RS may be configured by the RRC signaling. At this time, in a case that the TSS is configured, the terminal apparatus 1 receives the PSS, SSS, and TSS in the synchronization signal block. In a case that the TSS is not configured, the terminal apparatus 1 receives the PSS and SSS and PBCH in the synchronization signal block.

The terminal apparatus 1 performs measurements, based on the PSS, SSS, and TSS in a case that the TSS is configured, and performs measurements, based on the PSS and SSS in a case that the TSS is not configured.

Here, the measurements may include measuring received power per beam (e.g., L1-RSRP) and may include RRM measurements for the cell level.

In a case that the TSS is configured, the synchronization signal block ID (SS block identifier) may be defined based on the PSS, SSS, and TSS, and in a case that the third synchronization signal is not configured, the synchronization signal block identity (SS block identifier) may be defined based on the PSS and SSS.

In a case that the TSS is configured for the terminal apparatus 1, no PDSCH symbols are mapped to resource elements used in the PSS, SSS, and TSS, and in a case that the TSS is not configured, the symbols of the physical downlink shared channel are not mapped to resource elements used in the PSS and SSS.

In a case of receiving information related to the time positions of the synchronization signal blocks within the periodicity of synchronization signal blocks, the terminal apparatus 1 may assume that the PSS, SSS, and TSS are included in the time positions of the synchronization signal blocks received by the synchronization signal blocks, and may apply the above-described operation.

Now, the measurements will be described. The terminal apparatus 1 may receive the measurement object and perform the measurements based on information indicating whether the periodicity of synchronization signal blocks included in the measurement object is the same as or different from the periodicity of synchronization signal blocks in the serving cell corresponding to the frequency corresponding to the measurement object. For example, in a case that the periodicity of synchronization signal blocks is configured to be the same as the periodicity of synchronization signal blocks in the serving cell corresponding to the frequency corresponding to the measurement object, the terminal apparatus 1 assumes the periodicity configured for the serving cell and performs the measurements on synchronization signal blocks of a neighbor cell. In a case that the periodicity of synchronization signal blocks or the maximum number of synchronization signal blocks or the actual number of synchronization signal blocks is configured to be different from the periodicity or the maximum or actual number of synchronization signal blocks in the serving cell corresponding to the frequency corresponding to the measurement object, the terminal apparatus 1 assumes a default periodicity or a default maximum number or actual number of synchronization signal blocks and performs the measurements on the synchronization signal blocks of the neighbor cell.

The information related to the time positions within the synchronization signal may be received, and the measurements may be performed based on information indicating whether the time positions of the synchronization signal blocks included in the measurement object are the same as or different from the time positions in the serving cell corresponding to the frequency corresponding to the measurement object. For example, in a case that the information related to the time positions in the synchronization signal is configured to be the same as the information in the serving cell, the terminal apparatus 1 may assume the time positions configured for the serving cell and perform the measurements on the synchronization signal blocks of the neighbor cell. In a case that the information related to the time positions in the synchronization signal is configured to be the same as the information in the serving cell corresponding to the frequency corresponding to the measurement object, the terminal apparatus 1 may assume default time positions and perform the measurements on the synchronization signal blocks of the neighbor cell. The information indicating whether the time positions of the synchronization signal blocks included in the measurement object are the same as or different from the time positions in the serving cell corresponding to the frequency corresponding to the measurement object may be information indicating whether or not the time positions of the synchronization signal blocks are included in the measurement object.

The measurement object may be defined as an object of the measurements to be performed by the terminal apparatus. For intra-frequency and inter-frequency measurements, the measurement object may be defined as one NR carrier frequency. For measurement of Evolved Universal Terrestrial Radio Access (EUTRA, also referred to as LTE) between radio access technologies (inter-RAT), the measurement object may be defined as being one EUTRA carrier frequency or a set of cells on one EUTRA carrier frequency. For measurement of Universal Terrestrial Radio Access (UTRA, WCDMA (trade name), also referred to as HSPA) between radio access technologies (inter-RAT), the measurement object may be defined as a set of cells on one UTRA carrier frequency.

The measurement configuration including the measurement object may include information (measurement synchronization block periodicity information) indicating the periodicity of synchronization signal blocks. The measurement object may include information indicating whether the periodicity of synchronization signal blocks with the frequency (and/or the cell) to be measured is assumed to be the same as or different from the measurement synchronization block periodicity information.

The measurement configuration including the measurement object may include multiple measurement synchronization block periodicity information, and the measurement object may include information indicating which measurement synchronization block periodicity information is assumed to correspond to the periodicity of synchronization signal blocks with the frequency (and/or cell) to be measured.

The measurement object may include information of measurement resources for the synchronization signal blocks available for RSRP and RSRQ measurements for the neighbor cell at a carrier frequency indicated by a carrier frequency included in the measurement object. Note that the terminal apparatus 1 may assume that, in all the cells included in the cell list included in the measurement object, the measurement resources for the synchronization signal blocks are the same as the measurement resources for the synchronization signal blocks in a certain serving cell (e.g., PCell). Note that the measurement resources for the synchronization signal blocks may include one or more of the periodicity, the maximum number of synchronization signal blocks, and the actual number of synchronization signal blocks.

The measurement object may include information related to measurement resources for the synchronization signal blocks in the neighbor cell at a certain frequency. For example, one bit may be defined or implemented as described below.

0: the neighbor cell does not have the same measurement resources for the synchronization signal blocks as those in the serving cell 1: the measurement resources for the synchronization signal blocks in all the neighbor cells are same as the measurement resources for the synchronization signal blocks in the serving cell.

The terminal apparatus 1 performs the measurements, based on the above-described configurations, and reports measurement results to the base station apparatus 3.

An aspect of the present embodiment may be operated in carrier aggregation or dual connectivity with the Radio Access Technologies (RATs) such as LTE and LTE-A/LTE-A Pro. In this case, the aspect may be used for some or all of the cells or cell groups, or the carriers or carrier groups (e.g., Primary Cells (PCells), Secondary Cells (SCells), Primary Secondary Cells (PSCells), Master Cell Groups (MCGs), or Secondary Cell Groups (SCGs)). The aspect may be used in a stand-alone manner in which operation is performed independently.

Configurations of apparatuses according to the present embodiment will be described below. Here, an example is illustrated in which CP-OFDM is applied as a downlink radio transmission scheme, and CP DFTS-OFDM (SC-FDM) is applied as an uplink radio transmission scheme.

Figure 12:
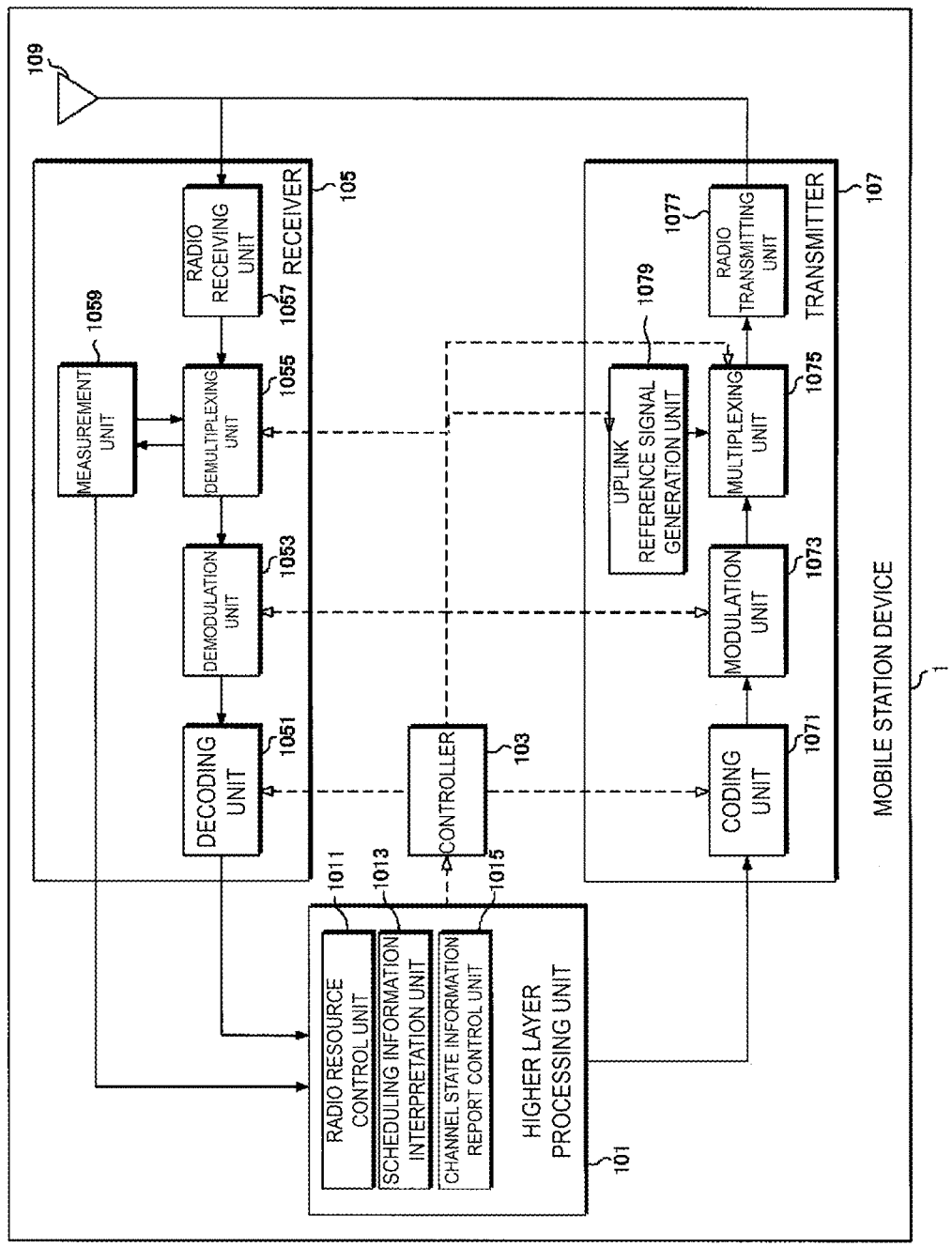
FIG. 12 is a schematic block diagram illustrating a configuration of a terminal apparatus 1 according to the present embodiment.

FIG. 12 is a schematic block diagram illustrating a configuration of the terminal apparatus 1 according to the present embodiment. As illustrated in FIG. 12, the terminal apparatus 1 is configured to include a higher layer processing unit 101, a controller 103, a receiver 105, a transmitter 107, and a transmit and/or receive antenna 109. The higher layer processing unit 101 is configured to include a radio resource control unit 1011, a scheduling information interpretation unit 1013, and a Channel State Information (CSI) report control unit 1015. The receiver 105 is configured to include a decoding unit 1051, a demodulation unit 1053, a demultiplexing unit 1055, a radio receiving unit 1057, and a measurement unit 1059. The transmitter 107 is configured to include a coding unit 1071, a modulation unit 1073, a multiplexing unit 1075, a radio transmitting unit 1077, and an uplink reference signal generation unit 1079.

The higher layer processing unit 101 outputs the uplink data (the transport block) generated by a user operation or the like, to the transmitter 107. The higher layer processing unit 101 performs processing of the Medium Access Control (MAC) layer, the Packet Data Convergence Protocol (PDCP) layer, the Radio Link Control (RLC) layer, and the Radio Resource Control (RRC) layer.

The radio resource control unit 1011 included in the higher layer processing unit 101 manages various configuration information of the terminal apparatus 1. The radio resource control unit 1011 generates information to be mapped to each uplink channel, and outputs the generated information to the transmitter 107.

The scheduling information interpretation unit 1013 included in the higher layer processing unit 101 interprets the DCI (scheduling information) received through the receiver 105, generates control information for control of the receiver 105 and the transmitter 107, in accordance with a result of interpreting the DCI, and outputs the generated control information to the controller 103.

The CSI report control unit 1015 indicates to the measurement unit 1059 to derive Channel State Information (RI/PMI/CQI/CRI) relating to the CSI reference resource. The CSI report control unit 1015 indicates to the transmitter 107 to transmit RI/PMI/CQI/CRI. The CSI report control unit 1015 sets a configuration that is used in a case that the measurement unit 1059 calculates CQI.

In accordance with the control information from the higher layer processing unit 101, the controller 103 generates a control signal for control of the receiver 105 and the transmitter 107. The controller 103 outputs the generated control signal to the receiver 105 and the transmitter 107 to control the receiver 105 and the transmitter 107.

In accordance with the control signal input from the controller 103, the receiver 105 demultiplexes, demodulates, and decodes a reception signal received from the base station apparatus 3 through the transmit and/or receive antenna 109, and outputs the decoded information to the higher layer processing unit 101.

The radio receiving unit 1057 converts (down-converts) a downlink signal received through the transmit and/or receive antenna 109 into a signal of an intermediate frequency, removes unnecessary frequency components, controls an amplification level in such a manner as to suitably maintain a signal level, performs orthogonal demodulation based on an in-phase component and an orthogonal component of the received signal, and converts the resulting orthogonally-demodulated analog signal into a digital signal. The radio receiving unit 1057 removes a portion corresponding to a Guard Interval (GI) from the digital signal resulting from the conversion, performs Fast Fourier Transform (FFT) on the signal from which the Guard Interval has been removed, and extracts a signal in the frequency domain.

The demultiplexing unit 1055 demultiplexes the extracted signal into the downlink PCCH, the downlink PSCH, and the downlink reference signal. The demultiplexing unit 1055 performs channel compensation for the PCCH and PSCH, based on the channel estimate value input from the measurement unit 1059. The demultiplexing unit 1055 outputs the downlink reference signal resulting from the demultiplexing, to the measurement unit 1059.

The demodulation unit 1053 demodulates the downlink PCCH and outputs a signal resulting from the demodulation to the decoding unit 1051. The decoding unit 1051 attempts to decode the PCCH. In a case of succeeding in the decoding, the decoding unit 1051 outputs downlink control information resulting from the decoding and an RNTI to which the downlink control information corresponds, to the higher layer processing unit 101.

The demodulation unit 1053 demodulates the PSCH in compliance with a modulation scheme indicated with the downlink grant, such as Quadrature Phase Shift Keying (QPSK), 16 Quadrature Amplitude Modulation (QAM), 64 QAM, or 256 QAM and outputs a signal resulting from the demodulation to the decoding unit 1051. The decoding unit 1051 performs decoding in accordance with information of a transmission or an original coding rate indicated with the downlink control information, and outputs, to the higher layer processing unit 101, the downlink data (the transport block) resulting from the decoding.

The measurement unit 1059 performs downlink path loss measurement, channel measurement, and/or interference measurement from the downlink reference signal input from the demultiplexing unit 1055. The measurement unit 1059 outputs, to the higher layer processing unit 101, the measurement result and CSI calculated based on the measurement result. The measurement unit 1059 calculates a downlink channel estimate value from the downlink reference signal and outputs the calculated downlink channel estimate value to the demultiplexing unit 1055.

The transmitter 107 generates the uplink reference signal in accordance with the control signal input from the controller 103, codes and modulates the uplink data (the transport block) input from the higher layer processing unit 101, multiplexes the PUCCH, the PUSCH, and the generated uplink reference signal, and transmits a signal resulting from the multiplexing to the base station apparatus 3 through the transmit and/or receive antenna 109.

The coding unit 1071 codes the Uplink Control Information and the uplink data input from the higher layer processing unit 101. The modulation unit 1073 modulates the coded bits input from the coding unit 1071, in compliance with a modulation scheme such as BPSK, QPSK, 16 QAM, 64 QAM, or 256 QAM.

The uplink reference signal generation unit 1079 generates a sequence determined according to a prescribed rule (formula), based on a physical cell identity (also referred to as a Physical Cell Identity (PCI), a Cell ID, or the like) for identifying the base station apparatus 3, a bandwidth in which the uplink reference signal is mapped, a cyclic shift indicated with the uplink grant, a parameter value for generation of a DMRS sequence, and the like.

Based on the information used for the scheduling of PUSCH, the multiplexing unit 1075 determines the number of PUSCH layers to be spatially-multiplexed, maps multiple uplink data to be transmitted on the same PUSCH to multiple layers through Multiple Input Multiple Output Spatial Multiplexing (MIMO Spatial Multiplexing, MIMO SM), and performs precoding on the layers.

In accordance with the control signal input from the controller 103, the multiplexing unit 1075 performs Discrete Fourier Transform (DFT) on modulation symbols of the PSCH. The multiplexing unit 1075 multiplexes PCCH and PSCH signals and the generated uplink reference signal for each transmit antenna port. To be more specific, the multiplexing unit 1075 maps the PCCH and PSCH signals and the generated uplink reference signal to the resource elements for each transmit antenna port.

The radio transmitting unit 1077 performs Inverse Fast Fourier Transform (IFFT) on a signal resulting from the multiplexing to perform modulation in compliance with an SC-FDM scheme, adds the Guard Interval to the SC-FDM-modulated SC-FDM symbol to generate a baseband digital signal, converts the baseband digital signal into an analog signal, generates an in-phase component and an orthogonal component of an intermediate frequency from the analog signal, removes frequency components unnecessary for the intermediate frequency band, converts (up-converts) the signal of the intermediate frequency into a signal of a high frequency, removes unnecessary frequency components, performs power amplification, and outputs a result to the transmit and/or receive antenna 109 for transmission.

Figure 13:
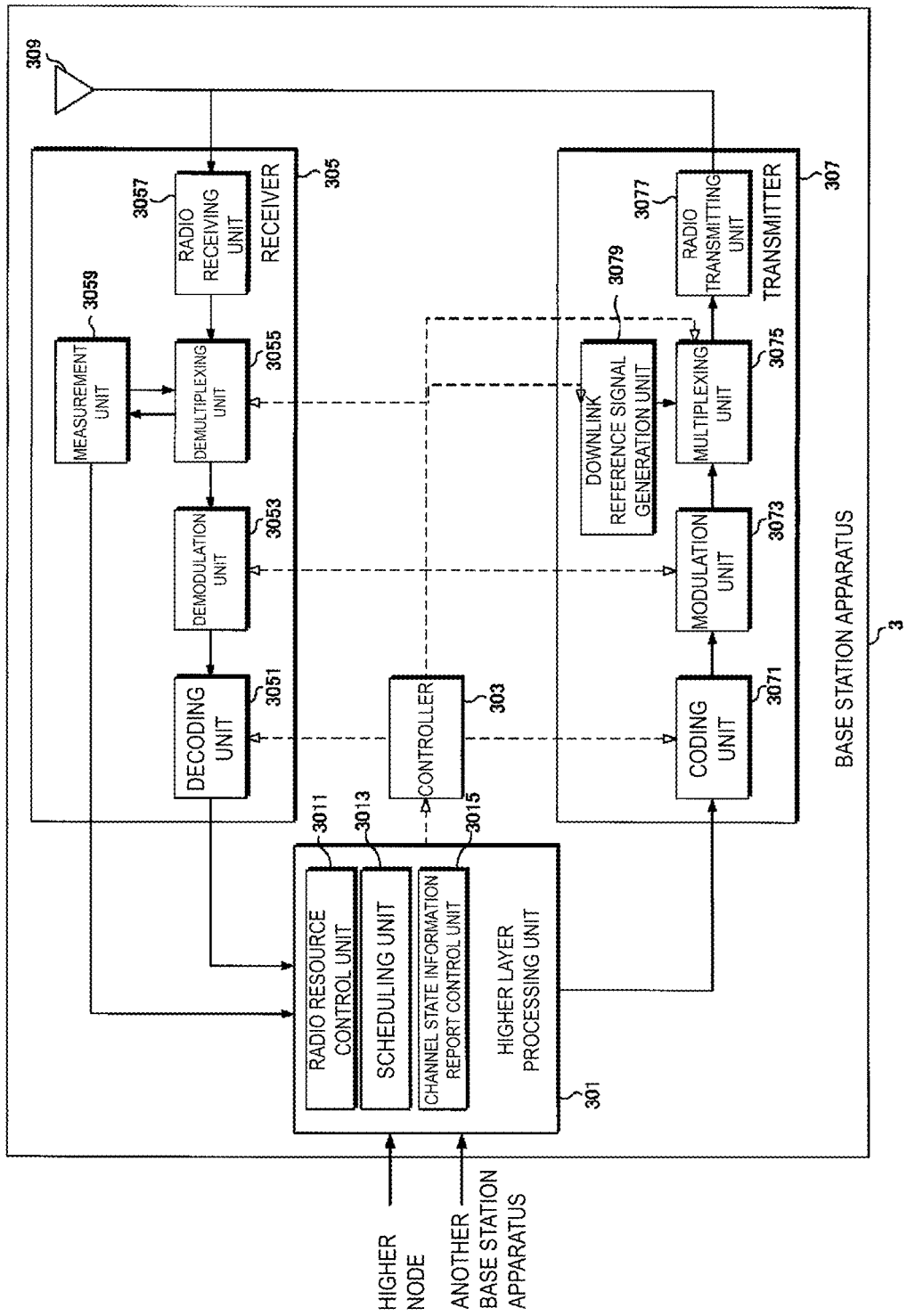
FIG. 13 is a schematic block diagram illustrating a configuration of a base station apparatus 3 according to the present embodiment.

FIG. 13 is a schematic block diagram illustrating a configuration of the base station apparatus 3 according to the present embodiment. As illustrated in FIG. 13, the base station apparatus 3 is configured to include a higher layer processing unit 301, a controller 303, a receiver 305, a transmitter 307, and a transmit and/or receive antenna 309. The higher layer processing unit 301 is configured to include a radio resource control unit 3011, a scheduling unit 3013, and a CSI report control unit 3015. The receiver 305 is configured to include a decoding unit 3051, a demodulation unit 3053, a demultiplexing unit 3055, a radio receiving unit 3057, and a measurement unit 3059. The transmitter 307 is configured to include a coding unit 3071, a modulation unit 3073, a multiplexing unit 3075, a radio transmitting unit 3077, and a downlink reference signal generation unit 3079.

The higher layer processing unit 301 performs processing of the Medium Access Control (MAC) layer, the Packet Data Convergence Protocol (PDCP) layer, the Radio Link Control (RLC) layer, and the Radio Resource Control (RRC) layer. The higher layer processing unit 301 generates control information for control of the receiver 305 and the transmitter 307, and outputs the generated control information to the controller 303.

The radio resource control unit 3011 included in the higher layer processing unit 301 generates, or acquires from a higher node, the downlink data (the transport block) mapped to the downlink PSCH, system information, the RRC message, the MAC Control Element (CE), and the like, and outputs a signal resulting from the generation or the acquirement to the transmitter 307. Furthermore, the radio resource control unit 3011 manages various configuration information for each of the terminal apparatuses 1.

The scheduling unit 3013 included in the higher layer processing unit 301 determines a frequency and a subframe to which the physical channel (PSCH) is allocated, the transmission coding rate and modulation scheme for the physical channel (PSCH), the transmit power, and the like, from the received CSI and from the channel estimate value, channel quality, or the like input from the measurement unit 3059. The scheduling unit 3013 generates the control information for control of the receiver 305 and the transmitter 307 in accordance with a result of the scheduling, and outputs the generated information to the controller 303. The scheduling unit 3013 generates the information (e.g., the DCI (format)) to be used for the scheduling of the physical channel (PSCH), based on the result of the scheduling.

The CSI report control unit 3015 included in the higher layer processing unit 301 controls a CSI report to be performed by the terminal apparatus 1. The CSI report control unit 3015 transmits information, assumed in order for the terminal apparatus 1 to derive RI/PMI/CQI in the CSI reference resource, for indicating various configurations, to the terminal apparatus 1 through the transmitter 307.

Based on the control information from the higher layer processing unit 301, the controller 303 generates a control signal for controlling the receiver 305 and the transmitter 307. The controller 303 outputs the generated control signal to the receiver 305 and the transmitter 307 to control the receiver 305 and the transmitter 307.

In accordance with the control signal input from the controller 303, the receiver 305 demultiplexes, demodulates, and decodes the reception signal received from the terminal apparatus 1 through the transmit and/or receive antenna 309, and outputs information resulting from the decoding to the higher layer processing unit 301. The radio receiving unit 3057 converts (down-converts) an uplink signal received through the transmit and/or receive antenna 309 into a signal of an intermediate frequency, removes unnecessary frequency components, controls the amplification level in such a manner as to suitably maintain a signal level, performs orthogonal demodulation based on an in-phase component and an orthogonal component of the received signal, and converts the resulting orthogonally-demodulated analog signal into a digital signal.

The radio receiving unit 3057 removes a portion corresponding to the Guard Interval (GI) from the digital signal resulting from the conversion. The radio receiving unit 3057 performs Fast Fourier Transform (FFT) on the signal from which the Guard Interval has been removed, extracts a signal in the frequency domain, and outputs the resulting signal to the demultiplexing unit 3055.

The demultiplexing unit 1055 demultiplexes the signal input from the radio receiving unit 3057 into signals such as the PCCH, the PSCH, and the uplink reference signal. The demultiplexing is performed based on radio resource allocation information, predetermined by the base station apparatus 3 using the radio resource control unit 3011, that is included in the uplink grant indicated to each of the terminal apparatuses 1. The demultiplexing unit 3055 performs channel compensation of the PCCH and the PSCH based on the channel estimate value input from the measurement unit 3059. The demultiplexing unit 3055 outputs an uplink reference signal resulting from the demultiplexing, to the measurement unit 3059.

The demodulation unit 3053 performs Inverse Discrete Fourier Transform (IDFT) on the PSCH, acquires modulation symbols, and demodulates a reception signal for each of the modulation symbols in the PCCH and the PSCH, in compliance with a predetermined modulation scheme such as Binary Phase Shift Keying (BPSK), QPSK, 16 QAM, 64 QAM, or 256 QAM, or in compliance with the modulation scheme that the base station apparatus 3 indicated to each of the terminal apparatuses 1 the uplink grant. The demodulation unit 3053 demultiplexes the modulation symbols of multiple uplink data transmitted in the same PSCH with the MIMO SM, based on the number of spatially-multiplexed sequences indicated in advance with the uplink grant to each of the terminal apparatuses 1 and information for indicating the precoding to be performed on the sequences.

The decoding unit 3051 decodes the coded bits of the PCCH and the PSCH, which have been demodulated, in compliance with a predetermined coding scheme by using the transmission or original coding rate that is predetermined or indicated in advance with the uplink grant to the terminal apparatus 1 by the base station apparatus 3, and outputs the decoded uplink data and uplink control information to the higher layer processing unit 101. In a case that the PSCH is retransmitted, the decoding unit 3051 performs the decoding with the coded bits, input from the higher layer processing unit 301, that are stored in an HARQ buffer, and the coded bits that have been demodulated. The measurement unit 3059 measures the channel estimate value, the channel quality, and the like, based on the uplink reference signal input from the demultiplexing unit 3055, and outputs a signal resulting from the measurement to the demultiplexing unit 3055 and the higher layer processing unit 301.

The transmitter 307 generates the downlink reference signal in accordance with the control signal input from the controller 303, codes and modulates the downlink control information and the downlink data that are input from the higher layer processing unit 301, multiplexes the PCCH, the PSCH, and the downlink reference signal and transmits a signal resulting from the multiplexing to the terminal apparatus 1 through the transmit and/or receive antenna 309 or transmits the PCCH, the PSCH, and the downlink reference signal to the terminal apparatus 1 through the transmit and/or receive antenna 309 by using separate radio resources.

The coding unit 3071 codes the downlink control information and the downlink data input from the higher layer processing unit 301. The modulation unit 3073 modulates the coded bits input from the coding unit 3071, in compliance with a modulation scheme such as BPSK, QPSK, 16 QAM, 64 QAM, and 256 QAM.

The downlink reference signal generation unit 3079 generates, as the downlink reference signal, a sequence known to the terminal apparatus 1, the sequence being determined in accordance with a predetermined rule based on the physical cell identity (PCI) for identifying the base station apparatus 3, or the like.

The multiplexing unit 3075, in accordance with the number of PSCH layers to be spatially-multiplexed, maps at least one of downlink data to be transmitted in one PSCH to at least one layer, and performs precoding for the at least one layer. The multiplexing unit 3075 multiplexes the downlink physical channel signal and the downlink reference signal for each transmit antenna port. The multiplexing unit 3075 maps the downlink physical channel signal and the downlink reference signal in the resource element for each transmit antenna port.

The radio transmitting unit 3077 performs Inverse Fast Fourier Transform (IFFT) on the modulation symbol resulting from the multiplexing or the like to perform the modulation in compliance with an OFDM scheme, adds the Guard Interval to the OFDM-modulated OFDM symbol to generate a baseband digital signal, converts the baseband digital signal into an analog signal, generates an in-phase component and an orthogonal component of an intermediate frequency from the analog signal, removes frequency components unnecessary for the intermediate frequency band, converts (up-converts) the signal of the intermediate frequency into a signal of a high frequency, removes unnecessary frequency components, performs power amplification, and outputs a result to the transmit and/or receive antenna 309 for transmission.

(1) More specifically, a terminal apparatus 1 according to a first aspect of the present invention is a terminal apparatus for communicating with a base station apparatus, the terminal apparatus 1 including a receiver configured to receive a first synchronization signal, a second synchronization signal, and a physical broadcast channel and to receive first information and second information, the first information including information for configuring a third synchronization signal, the second information including information for indicating a periodicity of synchronization signal blocks, the first synchronization signal, the second synchronization signal, and the third synchronization signal being received in a case that the third synchronization signal is configured, and the first synchronization signal, the second synchronization signal, and the physical broadcast channel being received in a case that the third synchronization signal is not configured.

(2) In the first aspect described above, in the case that the third synchronization signal is configured, measurements are performed based on the first synchronization signal, the second synchronization signal, and the third synchronization signal, and in the case that the third synchronization signal is not configured, the measurements are performed based on the first synchronization signal and the second synchronization signal.

(3) In the first aspect described above, in the case that the third synchronization signal is configured, a synchronization signal block identity is defined based on the first synchronization signal, the second synchronization signal, and the third synchronization signal, and in the case that the third synchronization signal is not configured, the synchronization signal block identity is defined based on the first synchronization signal and the second synchronization signal.

(4) In the first aspect described above, the receiver receives a physical downlink shared channel, and in the case that the third synchronization signal is configured, no symbols of the physical downlink shared channel are mapped to resource elements used in the first synchronization signal, the second synchronization signal, and the third synchronization signal, and in the case that the third synchronization signal is not configured, no symbols of the physical downlink shared channel are mapped to resource elements used in the first synchronization signal and the second synchronization signal.

(5) In the first aspect described above, the receiver receives third information, the third information includes information related to time positions of synchronization signal blocks within the periodicity, and the time positions are time indexes to which the synchronization signal blocks within the periodicity are mapped.

(6) A base station apparatus 3 according to a second aspect of the present invention is a base station apparatus for communicating with a terminal apparatus, the base station apparatus including a transmitter configured to transmit a first synchronization signal, a second synchronization signal, and a physical broadcast channel and to transmit first information and second information, the first information including information for configuring a third synchronization signal, and the second information including information for indicating a periodicity of synchronization signal blocks.

(7) In the second aspect described above, in a case that the third synchronization signal is configured, a synchronization signal block identity is defined based on the first synchronization signal, the second synchronization signal, and the third synchronization signal, and in a case that the third synchronization signal is not configured, the synchronization signal block identity is defined based on the first synchronization signal and the second synchronization signal.

(8) In the second aspect described above, the transmitter transmits a physical downlink shared channel, and in a case that the third synchronization signal is configured, no symbols of the physical downlink shared channel are mapped to resource elements used in the first synchronization signal, the second synchronization signal, and the third synchronization signal, and in a case that the third synchronization signal is not configured, no symbols of the physical downlink shared channel are mapped to resource elements used in the first synchronization signal and the second synchronization signal.

(9) In the second aspect described above, the transmitter transmits third information, the third information includes information related to time positions of synchronization signal blocks within the periodicity, and the time positions are time indexes to which the synchronization signal blocks within the periodicity are mapped.

(10) A communication method according to a third aspect of the present invention is a communication method for a terminal apparatus, the communication method including receiving a first synchronization signal, a second synchronization signal, and a physical broadcast channel, and receiving first information and second information, the first information including information for configuring a third synchronization signal, the second information including information for indicating a periodicity of synchronization signal blocks, the first synchronization signal, the second synchronization signal, and the third synchronization signal being received in a case that the third synchronization signal is configured, and the first synchronization signal, the second synchronization signal, and the physical broadcast channel being received in a case that the third synchronization signal is not configured.

(11) A communication method according to a fourth aspect of the present invention is a communication method for a base station apparatus, the communication method including transmitting a first synchronization signal, a second synchronization signal, and a physical broadcast channel, and transmitting first information and second information, the first information including information for configuring a third synchronization signal, and the second information including information for indicating a periodicity of synchronization signal blocks.

(12) An integrated circuit according to a fifth aspect of the present invention is an integrated circuit mounted in a terminal apparatus, the integrated circuit including a receiving component configured to receive a first synchronization signal, a second synchronization signal, and a physical broadcast channel and to receive first information and second information, the first information including information for configuring a third synchronization signal, the second information including information for indicating a periodicity of synchronization signal blocks, the first synchronization signal, the second synchronization signal, and the third synchronization signal being received in a case that the third synchronization signal is configured, and the first synchronization signal, the second synchronization signal, and the physical broadcast channel being received in a case that the third synchronization signal is not configured.

(13) An integrated circuit according to a sixth aspect of the present invention is an integrated circuit mounted in a base station apparatus, the integrated circuit including a transmitting component configured to transmit a first synchronization signal, a second synchronization signal, and a physical broadcast channel and to transmit first information and second information, the first information including information for configuring a third synchronization signal, and the second information including information for indicating a periodicity of synchronization signal blocks.

A program running on an apparatus according to an aspect of the present invention may serve as a program that controls a Central Processing Unit (CPU) and the like to cause a computer to function in such a manner as to realize the functions of the embodiment according to the aspect of the present invention. Programs or the information handled by the programs are temporarily stored in a volatile memory such as a Random Access Memory (RAM), a non-volatile memory such as a flash memory, a Hard Disk Drive (HDD), or any other storage device system.

Note that a program for realizing the functions of the embodiment according to an aspect of the present invention may be recorded in a computer-readable recording medium. This configuration may be realized by causing a computer system to read the program recorded on the recording medium for execution. It is assumed that the "computer system" refers to a computer system built into the apparatuses, and the computer system includes an operating system and hardware components such as a peripheral device. Furthermore, the "computer-readable recording medium" may be any of a semiconductor recording medium, an optical recording medium, a magnetic recording medium, a medium dynamically retaining the program for a short time, or any other computer readable recording medium.

Furthermore, each functional block or various characteristics of the apparatuses used in the above-described embodiments may be implemented or performed on an electric circuit, for example, an integrated circuit or multiple integrated circuits. An electric circuit designed to perform the functions described in the present specification may include a general-purpose processor, a Digital Signal Processor (DSP), an Application Specific Integrated Circuit (ASIC), a Field Programmable Gate Array (FPGA), or other programmable logic devices, discrete gates or transistor logic, discrete hardware components, or a combination thereof. The general-purpose processor may be a microprocessor or may be a processor of known type, a controller, a micro-controller, or a state machine instead. The above-mentioned electric circuit may include a digital circuit, or may include an analog circuit. Furthermore, in a case that with advances in semiconductor technology, a circuit integration technology appears that replaces the present integrated circuits, it is also possible to use a new integrated circuit based on the technology according to one or more aspects of the present invention.

Note that the invention of the present patent application is not limited to the above-described embodiments. In the embodiments, apparatuses have been described as an example, but the invention of the present application is not limited to these apparatuses, and is applicable to a terminal apparatus or a communication apparatus of a fixed-type or a stationary-type electronic apparatus installed indoors or outdoors, for example, an AV apparatus, a kitchen apparatus, a cleaning or washing machine, an air-conditioning apparatus, office equipment, a vending machine, and other household apparatuses.

The embodiments of the present invention have been described in detail above referring to the drawings, but the specific configuration is not limited to the embodiments and includes, for example, an amendment to a design that falls within the scope that does not depart from the gist of the present invention. Furthermore, various modifications are possible within the scope of one aspect of the present invention defined by claims, and embodiments that are made by suitably combining technical means disclosed according to the different embodiments are also included in the technical scope of the present invention. Furthermore, a configuration in which constituent elements, described in the respective embodiments and having mutually the same effects, are substituted for one another is also included in the technical scope of the present invention.

INDUSTRIAL APPLICABILITY

An aspect of the present invention can be utilized, for example, in a communication system, communication equipment (for example, a cellular phone apparatus, a base station apparatus, a radio LAN apparatus, or a sensor device), an integrated circuit (for example, a communication chip), or a program.

REFERENCE SIGNS LIST 1 (1A, 1B, 1C) Terminal apparatus
3 Base station apparatus

10 Transceiver unit
11 Phase shifter
12 Antenna
101 Higher layer processing unit
103 Controller
105 Receiver
107 Transmitter
109 Antenna
301 Higher layer processing unit
303 Controller
305 Receiver
307 Transmitter
1011 Radio resource control unit
1013 Scheduling information interpretation unit
1015 Channel State Information report control unit
1051 Decoding unit
1053 Demodulation unit
1055 Demultiplexing unit
1057 Radio receiving unit
1059 Measurement unit
1071 Coding unit
1073 Modulation unit
1075 Multiplexing unit
1077 Radio transmitting unit
1079 Uplink reference signal generation unit
3011 Radio resource control unit
3013 Scheduling unit
3015 Channel State Information report control unit
3051 Decoding unit
3053 Demodulation unit
3055 Demultiplexing unit
3057 Radio receiving unit
3059 Measurement unit
3071 Coding unit
3073 Modulation unit
3075 Multiplexing unit
3077 Radio transmitting unit
3079 Downlink reference signal generation unit

The invention claimed is:

1. A terminal apparatus comprising:
higher layer processing circuitry configured to receive first information, second information, and third information;
reception circuitry configured to receive a block including a first signal, a second signal, a third signal, and a physical broadcast channel (PBCH); and
measurement circuitry configured to perform received signal reference power (RSRP) measurement for the block, wherein
the first information includes information indicating a periodicity of one or more blocks of a serving cell,
the second information includes information indicating time positions of the one or more blocks of the serving cell within a certain time duration,
the third information includes information to indicate whether time positions of one or more blocks of a neighbor cell are same or not as that of the serving cell,
a physical cell identity is detected from the first signal and the second signal, and
an index of the block is detected from the third signal and the PBCH.

2. A base station apparatus comprising:
higher layer processing circuitry configured to transmit first information, second information, and third information; and
transmission circuitry configured to transmit a block including a first signal, a second signal, a third signal, and a physical broadcast channel (PBCH), wherein
the first information includes information indicating a periodicity of one or more blocks of a serving cell,
the second information includes information for indicating time positions of the one or more blocks of the serving cell within a certain time duration,
the third information includes information to indicate whether time positions of one or more blocks of a neighbor cell are same or not as that of the serving cell,
a physical cell identity is detected from the first signal and the second signal, and
an index of the block is detected from the third signal and the PBCH.

3. A communication method for a terminal apparatus, the communication method comprising the steps of:
receiving first information, second information and third information;
receiving a block including a first signal, a second signal, a third signal, and a physical broadcast channel (PBCH); and
performing received signal reference power (RSRP) measurement for the block, wherein
the first information includes information indicating a periodicity of one or more blocks of a serving cell,
the second information includes information for indicating time positions of the one or more blocks of the serving cell within a certain time duration,
the third information includes information to indicate whether time positions of one or more blocks of a neighbor cell are same or not as that of the serving cell,
a physical cell identity is detected from the first signal and the second signal, and
an index of the block is detected from the third signal and the PBCH.

4. A communication method for a base station apparatus, the communication method comprising the steps of:
transmitting first information, second information and third information; and
transmitting a block including a first signal, a second signal, a third signal, and a physical broadcast channel (PBCH), wherein
the first information includes information indicating a periodicity of one or more blocks of a serving cell,
the second information includes information for indicating time positions of the one or more blocks of the serving cell within a certain time duration,
the third information includes information to indicate whether time positions of one or more blocks of a neighbor cell are same or not as that of the serving cell,
a physical cell identity is detected from the first signal and the second signal, and
an index of the block is detected from the third signal and the PBCH.

5. An integrated circuit mounted in a terminal apparatus, the integrated circuit comprising circuitry being configured to perform at least functions of:
receiving first information, second information and third information;
receiving a block including a first signal, a second signal, a third signal, and a physical broadcast channel (PBCH); and
performing received signal reference power (RSRP) measurement for the block, wherein
the first information includes information indicating a periodicity of one or more blocks of a serving cell, the second information includes information for indicating time positions of the one or more blocks of the serving cell within a certain time duration, the third information includes information to indicate whether the time positions of one or more blocks of a neighbor cell are same or not as that of the serving cell, a physical cell identity is detected from the first signal and the second signal, and an index of the block is detected from the third signal and the PBCH.

6. An integrated circuit mounted in a base station apparatus, the integrated circuit comprising circuitry being configured to perform at least functions of:

transmitting first information, second information and third information; and transmitting a block including a first signal, a second signal, a third signal, and a physical broadcast channel (PBCH), wherein the first information includes information indicating a periodicity of one or more blocks of a serving cell, the second information includes information for indicating time positions of the one or more blocks of the serving cell within a certain time duration, the third information includes information to indicate whether time positions of one or more blocks of a neighbor cell are same or not as that of the serving cell, a physical cell identity is detected from the first signal and the second signal, and an index of the block is detected from the third signal and the PBCH.

* * * * *